United States Patent
Tominaga et al.

(10) Patent No.: US 7,418,009 B2
(45) Date of Patent: Aug. 26, 2008

(54) METHOD OF TRANSFERRING FRAMES OF VARIABLE LENGTH FOR A PASSIVE OPTICAL NETWORK THAT IMPROVES NETWORK EFFICIENCY AND SIMPLIFIES CHILD APPARATUS

(75) Inventors: Susumu Tominaga, Kawasaki (JP); Masaharu Matsumoto, Kawasaki (JP); Takamitsu Shirai, Kawasaki (JP); Katsuhiko Hirashima, Fukuoka (JP); Kazuhiro Uchida, Fukuoka (JP); Kenichi Abe, Kawasaki (JP); Shigeharu Murakami, Kawasaki (JP); Miho Kawai, Kawasaki (JP); Kiyotaka Shikata, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1006 days.

(21) Appl. No.: 10/134,545

(22) Filed: Apr. 30, 2002

(65) Prior Publication Data

US 2003/0095568 A1     May 22, 2003

(30) Foreign Application Priority Data

Nov. 19, 2001     (JP)     ............................. 2001-353754

(51) Int. Cl.
*H04J 3/16*     (2006.01)
(52) U.S. Cl. ...................................... 370/470; 370/392
(58) Field of Classification Search ................. 370/336, 370/337, 345, 346, 347, 348, 349, 392, 401, 370/389, 390, 412, 468, 470
See application file for complete search history.

(56) References Cited

U.S. PATENT DOCUMENTS 5,497,371 A * 3/1996 Ellis et al. ................... 370/412
5,613,070 A * 3/1997 Born ........................... 709/253
6,408,007 B1 * 6/2002 Park ............................ 370/412
6,546,014 B1 * 4/2003 Kramer et al. ........... 370/395.41

(Continued)

FOREIGN PATENT DOCUMENTS

EP     1 017 244     7/2000

(Continued)

OTHER PUBLICATIONS

Kazuhisa Kaede et al., "A Passive Double Star Optical Subscriber System with Frequency Division Duplex Transmission and Flexible Access", IEICE Transactions on Communications, Institute of Electronics Information and COMM. Eng. Tokyo, Japan, vol. E75-B, No. 9, Sep. 1, 1992, pp. 841-848, XP000321319, ISSN: 916-8516.

(Continued)

*Primary Examiner*—Firmin Backer
*Assistant Examiner*—Christine Ng
(74) *Attorney, Agent, or Firm*—Staas & Halsey LLP

(57) ABSTRACT

A method of communicating through a passive optical network (PON) that improves the efficiency of the network with low cost child apparatuses having only simple functions. A parent apparatus provides the child apparatuses with a multi-frame standard signal, and a child apparatus transfers asynchronous information as a frame of variable length, as it is, at a time delayed from the multi-frame standard signal by a time period designated by the parent apparatus. Since the asynchronous information does not need to be divided into pieces to which a frame header is attached, the efficiency of the uplink channel is increased.

16 Claims, 27 Drawing Sheets

U.S. PATENT DOCUMENTS

| | | |
|---|---|---|
| 6,950,968 B1 * 9/2005 | Parolari et al. | 714/43 |
| 6,970,461 B2 * 11/2005 | Unitt et al. | 370/390 |
| 2002/0006111 A1 * 1/2002 | Akita et al. | 370/235 |
| 2002/0057688 A1 5/2002 | Hamasaki et al. | |
| 2003/0091045 A1 5/2003 | Choi et al. | |

FOREIGN PATENT DOCUMENTS

| | | |
|---|---|---|
| EP | 1 096 731 | 5/2001 |
| EP | 1 130 841 | 9/2001 |
| JP | 9-510053 | 10/1997 |
| JP | 11-146000 | 5/1999 |
| JP | 11-215146 | 8/1999 |
| JP | 2000-4251 | 1/2000 |
| JP | 2000-92011 | 3/2000 |
| JP | 2000-312208 | 11/2000 |
| JP | 2001-203736 | 7/2001 |
| JP | 2002-300180 | 10/2002 |
| JP | 2003-283521 | 10/2003 |
| WO | 95-19689 | 7/1995 |
| WO | WO 98/44758 | 10/1998 |
| WO | WO 01/05096 | 1/2001 |

OTHER PUBLICATIONS

European Search Report, issued Nov. 16, 2005, for related European Patent Application EP 02010114.3-2415.

Japanese Office Action issued with respect to Japanese Patent Application No. 2001-353754, mailed May 16, 2006.

* cited by examiner

FIG.11

| No. | NAME | CONTENTS | REMARK |
|---|---|---|---|
| 1 | CHILD APPARATUS NUMBER | NUMBER DESIGNATING A CHILD APPARATUS | |
| 2 | DELAY TIME | ACTUAL DELAY TIME MEASURED | |
| 3 | DESIGNATED BAND | BAND DESIGNATED TO EACH CHILD APPARATUS | |
| 4 | COMMAND | CONTROL INFORMATION TO CHILD APPARATUS, CONTROL INFORMATION TO TERMINAL, RESPONSE | CONTROL INFORMATION INCLUDES REQUEST FOR COLLECTION OF STATISTICAL INFORMATION AND DESIGNATED DA/SA ADDRESS FILTER CONDITION, FOR EXAMPLE |

FIG.18

| INPUT | | | | OUTPUT | REMARKS |
|---|---|---|---|---|---|
| | DESTINATION ADDRESS | SENDER ADDRESS | TYPE OF CONTROL | | |
| INPUT PROCESSING UNIT No. (1) | | | | OUTPUT PROCESSING UNIT No. 3 (1) | |
| INPUT PROCESSING UNIT No. (1) | | | | OUTPUT PROCESSING UNIT No. 1 (3) | |
| INPUT PROCESSING UNIT No. (2) | | | | OUTPUT PROCESSING UNIT No. 3 (2) | |
| | | | | | |
| | | | | | |
| INPUT PROCESSING UNIT No. (x) | | | | | |

METHOD OF TRANSFERRING FRAMES OF VARIABLE LENGTH FOR A PASSIVE OPTICAL NETWORK THAT IMPROVES NETWORK EFFICIENCY AND SIMPLIFIES CHILD APPARATUS

BACKGROUND OF THE INVENTION

1. Field of the Invention

The present invention generally relates to Passive Optical Network (PON) communication method and apparatus thereof, more particularly, to PON communication method and system in which a plurality of terminals communicates each other through a parent apparatus, a coupler, and a plurality of child apparatuses.

2. Description of the Related Art

As one of the promising solutions to materialize the fiber-to-the-home concept (FTTH), the passive-optical-network (PON) method that utilizes passive couplers to branch optical fibers at a low cost draws public attention.

Conventionally, ATM-PON in which asynchronous-transfer-mode (ATM) is applied to the PON method has been the main topic of the development. ATM-PON converts information such as Internet Protocol (IP) frames of variable length that is provided by terminals into ATM cells and transfers the ATM cells through the PON.

In the conventional ATM-PON method, however, since asynchronous information of variable length is converted into ATM cells, the overhead portion of the ATM cells is so great compared with the information, that the information is not transferred through PON efficiently.

It is required that the conventional PON be provided with complicated protocols and functions that materialize an ATM layer interface. Additionally, because a child apparatus of the PON to which a user's terminal is connected must have a function of converting IP frames sent by the user's terminal into ATM cells to be transferred through the ATM-PON, the cost of the child apparatus is very high.

SUMMARY OF THE INVENTION

Accordingly, it is a general object of the present invention to provide a novel and useful communication method and a system thereof in which one or more of the problems described above are eliminated.

Another and more specific object of the present invention is to provide a PON communication method and a system thereof in which information is transferred efficiently using child apparatuses having simple functions that are available at a low cost.

To achieve the above objects, a method of communicating through a PON, according to the present invention, in which a plurality of child apparatuses is connected to a parent apparatus through a coupler, includes a step of the parent apparatus designating a time period to each child apparatus, a step of the parent apparatus informing each child apparatus of the designated time period, a step of each child apparatus receiving a reference signal sent by the parent apparatus, and a step of each child apparatus sending a frame of variable length stored therein to the parent apparatus when the designated time period has passed from the receipt of the reference signal.

Each child apparatus transfers a frame of a variable length at a time that is designated by the parent apparatus by the reference signal and the time period. Since a frame of a variable length, that is, asynchronous information, can be transferred as it is through a PON, it is not necessary to divide the asynchronous information into a plurality of sub-frames and to attach a header to each sub-frame. Accordingly, the efficiency of the uplink channel of a PON can be increased.

Another object of the present invention is to provide the method as described above, wherein the parent apparatus multiplexes frames of variable length to be sent to the child apparatuses and sends the multiplexed frames to the child apparatuses.

Since the parent apparatus transfers, to a plurality of child apparatuses, a multi-frame in which frames of a variable length are multiplexed and the reference signal is attached in front of the multiplexed frames, the efficiency of the downlink channel of the PON can also be increased.

Another object of the present invention is to provide a child apparatus for a PON in which a plurality of child apparatuses is connected to a parent apparatus through a coupler, comprising a reference signal detecting unit that detects a reference signal sent by the parent apparatus, a multiplexing unit that multiplexes frames of variable length sent by a plurality of terminals connected to the child apparatus, and a transmitting unit that transmits the multiplexed frames to the parent apparatus when a time period designated by the parent apparatus has passed from the detection of the reference signal.

The child apparatus described above realizes the method of communicating through a PON according to the present invention.

Another object of the present invention is to provide a parent apparatus for a PON in which a plurality of child apparatuses is connected to a parent apparatus through a coupler, comprising a multi-frame generating unit that generates a multi-frame by multiplexing frames of variable length to be sent to the child apparatuses and attaching a reference signal in front of the multiplexed frames, wherein the multi-frame is sent to the child apparatuses.

The parent apparatus described above realized the method of communicating through a PON according to the present invention.

Other objects, features, and advantages of the present invention will become more apparent from the following detailed description when read in conjunction with the accompanying drawings.

BRIEF DESCRIPTION OF THE DRAWINGS

FIG. 11 is schematic drawing showing predetermined information according to the embodiment of the present invention;

FIG. 18 is an example of a control table 130;

DETAILED DESCRIPTION OF THE PREFERRED EMBODIMENTS

A detailed description of the preferred embodiments of the present invention will be given below.

Figure 1:
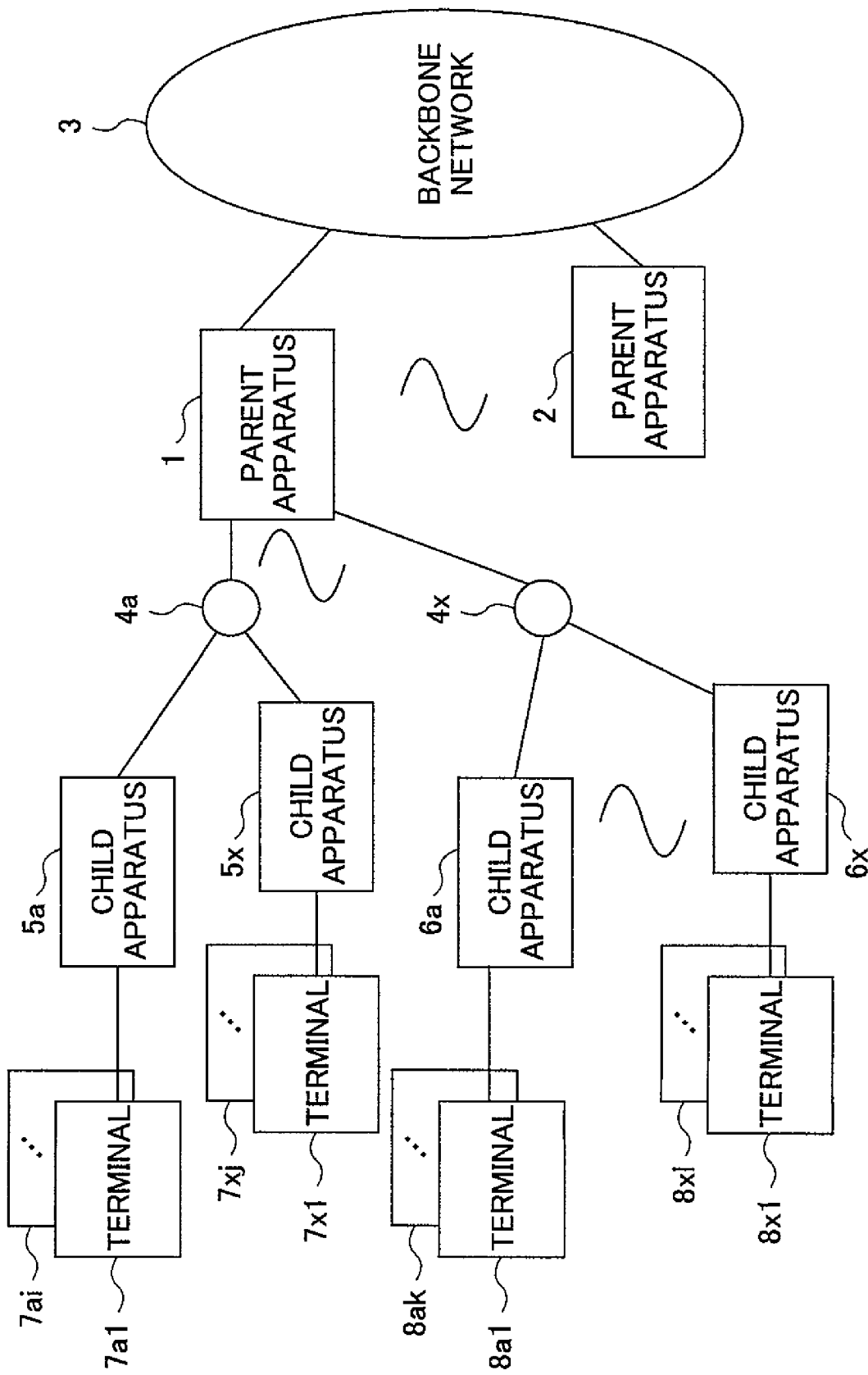
FIG. 1 is a schematic diagram showing the entire structure of a PON system.

FIG. 1 is a schematic drawing showing the entire structure of a passive optical network (PON) system. Parent apparatuses 1 and 2 have uplink channels that are connected to a backbone network 3 and realize various communications with an external network. The parent apparatuses 1 and 2 further have downlink channels, each connected to a plurality of child apparatuses 5a- 5x, . . . , 6a-6x through couplers 4a-4n. The parent apparatuses 1 and 2 exchange frames between the uplink channels and the downlink channels. Each of the child apparatuses 5a-5x and 6a-6x transfers frames between the parent apparatus 1 and a plurality of terminals 7a1-7ai, 7x1-7xj, 8a1-8ak, and 8x1-8xl that are connected to the respective child apparatuses.

Figure 2:
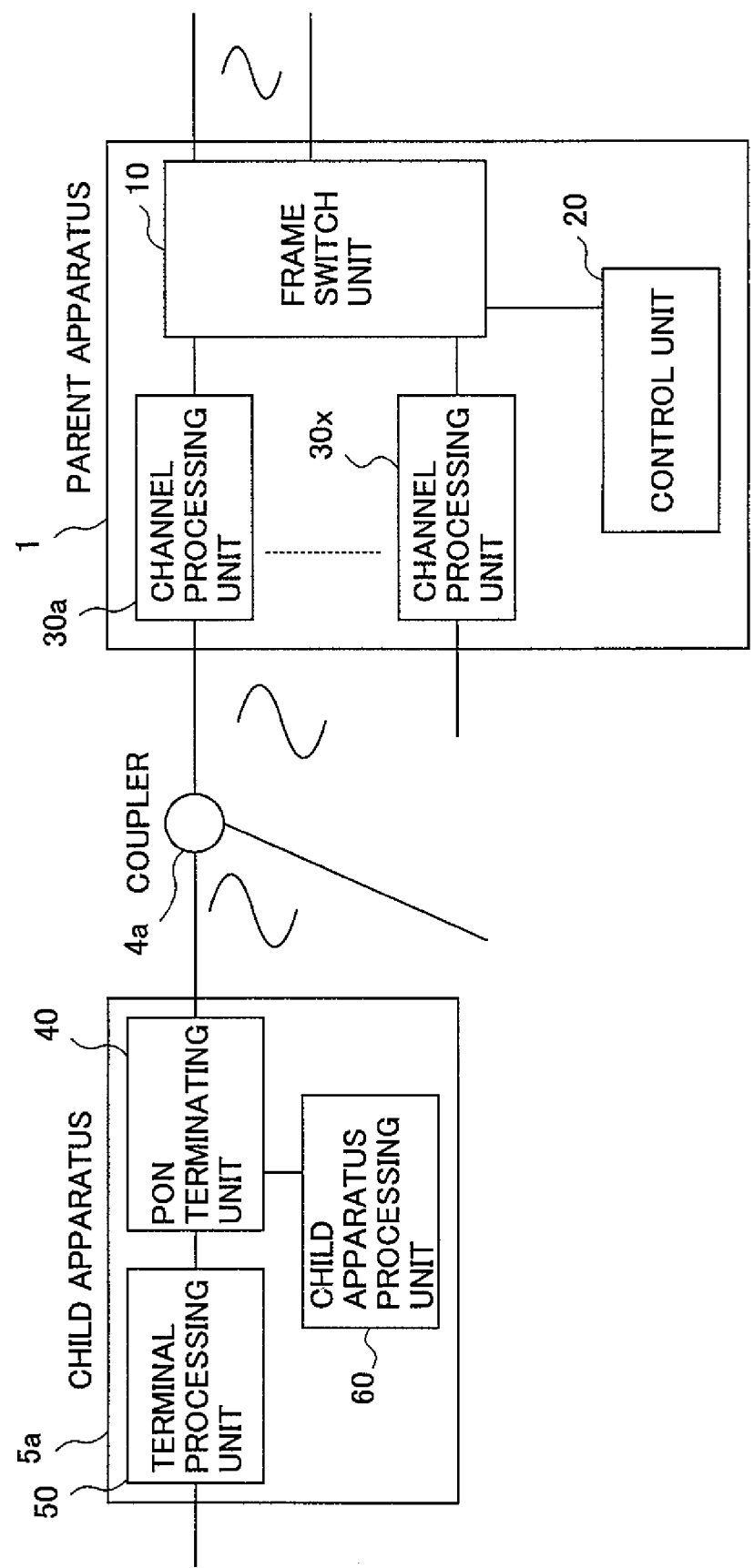
FIG. 2 is a block diagram showing a parent apparatus and a child apparatus according to the embodiment of the present invention.

FIG. 2 is a block diagram showing a parent apparatus 1 and a child apparatus 5a according to an embodiment of the present invention. The uplink channel through which a frame provided by a terminal is transferred to the backbone network through a child apparatus and a parent apparatus will be described below first.

The child apparatus 5a showed in FIG. 2 includes a PON terminating unit 40, a terminal processing unit 50, and a child apparatus processing unit 60.

The terminal processing unit 50 receives frames sent by a plurality of terminals, and identifies only frames to be transferred to the backbone network or the other child apparatuses by filtering the frames exchanged between terminals connected to the child apparatus itself.

Since the coupler 4a is shared by a plurality of child apparatuses 5a-5x, the PON terminating unit 40 must wait for a time at which only the PON terminating unit 40 can send the frames to the parent apparatus 1 through the uplink channel to avoid the collision of frames.

The parent apparatus 1 showed in FIG. 2 includes a frame switch (SW) unit 10, a control unit 20, and channel processing units 30a-30x. The channel processing unit 30a receives the frames sent by a plurality of child apparatuses 5a-5x through the 1-to-N coupler 4a, identifies the frames to be sent to the backbone network or other child apparatuses connected to the parent apparatus 1, and transfers the frames to the frame switch unit 10. The frame switch unit 10 has a function of switching the frames received from the channel processing units 30a-30x depending on destinations of the frames, and transfers the frames to the respective destinations.

Next, a downlink channel through which the frames provided by the backbone network are transferred to a terminal through the parent apparatus and the child apparatus will be explained below. The parent apparatus 1 receives the frames provided by the backbone network and transfers, if the frames are addressed to one of the terminals connected to the child apparatuses under the parent apparatus 1, the frames to the PON terminating unit 40 of the child apparatus to which the frames are addressed.

The channel processing unit 30a distributes the frame to a plurality of child apparatuses 5a-5x through the coupler 4a. The PON terminating unit 40 of the child apparatus 5a reads the address of the frame and transfers the frame to the terminal processing unit 50 if the frame is addressed to the child apparatus 5a or one of the terminals connected to the child apparatus 5a.

FIG. 3A-3F are schematic drawings showing frame formats according to the embodiment of the present invention.

Figure 3:
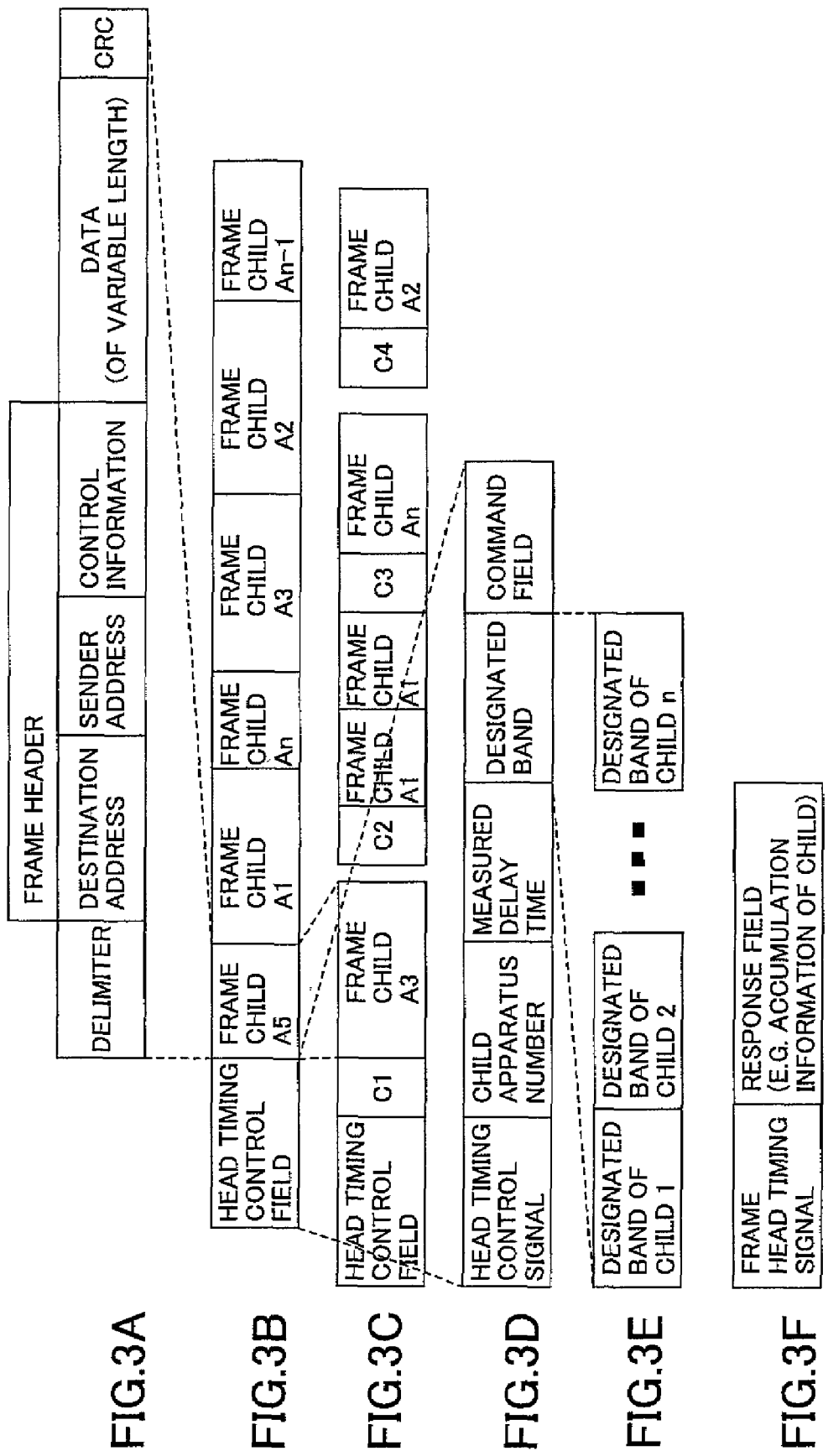
FIG. 3A-3F are schematic drawings showing frame formats utilized by the PON system according to the embodiment of the present invention.

FIG. 3A shows the frame format of a frame that is exchanged between two terminals or between a terminal and a child apparatus (hereinafter, referred to as a "user frame"). The user frame includes (i) a delimiter indicating the head of the user frame, (ii) a frame header including a destination address, a sender address, and control information, and (iii) a data field containing data of variable length. At the end of the user frame, an error check sequence (CRC) is attached for error detection.

This frame format complies with the standards such as IEEE and RFC. Signals such as a preamble and a gap exist between two consecutive frames to indicate the separation of the frames.

FIG. 3B shows the format of a downlink multi-frame that is transferred from the parent apparatus to the child apparatuses through the downlink channel. The downlink multi-frame includes a head timing control field followed by a plurality of user frames of variable lengths addressed to the respective child apparatuses. The head timing control field consists of a synchronous pattern and a control header. The cycle time (head timing cycle) between a head timing control field and the next head timing control field is fixed at 3.5 ms, for example. Since the user frames are of variable lengths, the number of user frames that is multiplexed is also variable.

FIG. 3C shows the frame format of an uplink multi-frame that is transferred from the child apparatuses to the parent apparatus thorough the uplink channel. The uplink multi-frame includes a head timing control field followed by multiplexed user frames of variable lengths sent from a plurality of child apparatuses. This head timing control field consists of a synchronous pattern and a control header. The cycle time (head timing cycle) between a head timing control field and the next head timing control field is fixed at 3.5 ms, for example.

A control field C1-Cn that informs the parent apparatus of timing information of each child apparatus, is provided in front of each user frame. The control field C1-Cn is followed by multiplexed user frames sent by each child apparatus. The control field C1-Cn is provided to every frame sent by the child apparatus to inform the parent apparatus of the control information of the child apparatus or to respond to a control command sent by the parent apparatus. Since the user frames are of variable lengths, the number of the multiplexed user frames is also variable.

The downlink multi-frame showed in FIG. 3B and the uplink multi-frame showed in FIG. 3C are multiplexed by sharing the wavelength.

FIG. 3D is a schematic drawing showing the details of the head timing control field showed in FIG. 3B and FIG. 3C. The head control timing field includes a head timing signal, a child apparatus number, a measured delay time, a plurality of designated bands, and a command field.

FIG. 3E is a schematic drawing showing the designated bands showed in FIG. 3D.

FIG. 3F is a schematic drawing showing the control field C1-Cn included in the uplink multi-frame showed in FIG. 3C. The control field C1-Cn includes a frame head timing signal and a response field indicating information about user frames stored in each child apparatus, for example.

Figure 4:
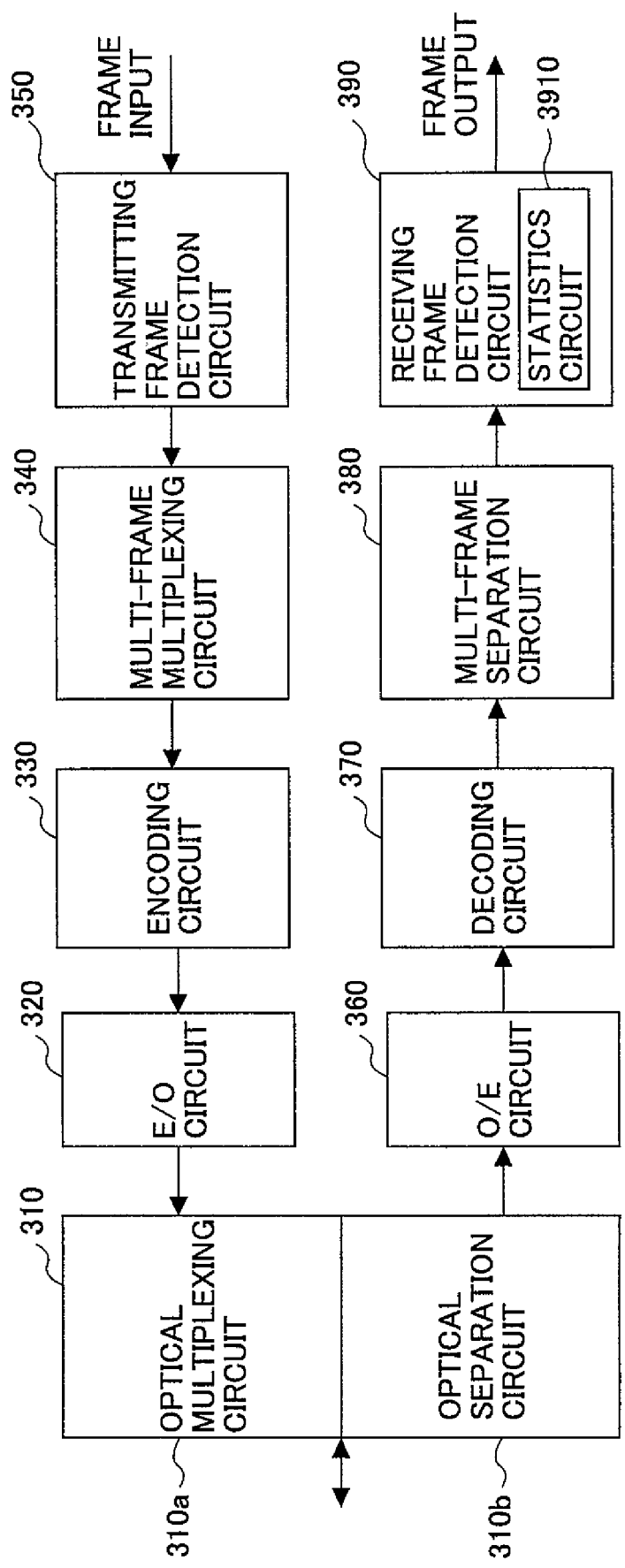
FIG. 4 is a block diagram showing a channel processing unit of a parent apparatus according to the embodiment of the present invention.

FIG. 4 is a block diagram showing the channel processing units 30a-30x according to the embodiment of the present invention.

A transmitting frame detection circuit 350 receives a user frame (input frame) provided by the frame switch unit 10 and transfers the input frame to a multi-frame multiplexing circuit 340. The transmitting frame detection circuit 350 is provided with an IGMP center unit of which description will be given later. The IGMP center unit recognizes an HMR received from a terminal connected to a child apparatus connected to the parent apparatus itself, and sets the child apparatus to perform a multicast distribution to the terminal by providing the address of the terminal and a multicast group the terminal wants to join.

The multi-frame multiplexing circuit 340 multiplexes the input frames and attaches a head timing control field in front of the multiplexed input frames to form a downlink multi-frame as showed in FIG. 3B. The multi-frame multiplexing circuit 340 then transfers the downlink multi-frame to an encoding circuit 330.

The encoding circuit 330 encodes the downlink multi-frame using the optical logic level and transfers the downlink multi-frame to an E/O circuit 320.

The E/O circuit 320 converts the electric signal into an optical signal and sends the optical signal to an optical multiplexing circuit 310a.

The optical multiplexing circuit 310a multiplexes the transmitting optical signal with a received optical signal using different wavelengths and sends the multiplexed optical signal to the couplers 4a-4x.

On the other hand, an optical signal sent by the coupler 4a-4x is provided to an optical separation circuit 310b. Only a received optical signal is separated from the transmitting optical signal and transferred to an O/E circuit 360.

The O/E circuit 360 converts the optical signal into an electric signal and transfers the electric signal to a decoding circuit 370.

The decoding circuit 370 detects a delimiter and a frame header of the electric signal (a multi-frame) and transfers the multi-frame to a multi-frame separation circuit 380.

The multi-frame separation circuit 380 separates the user frames from the head timing control field. The multi-frame separation circuit 380 transfers only the user frames to a receiving frame detection circuit 390, and terminates the head timing control field.

The receiving frame detection circuit 390 determines whether the user frames separated by the multi-frame separation circuit 380 are damaged and checks the classification of the user frames. The user frames are further transferred to the frame switch unit 10.

A statistics circuit 3910 provided in the receiving frame detection circuit 390 measures an effective frame rate of each child apparatus and holds a record of the effective frame rate of each child apparatus. The effective frame rate is a rate of frame size that is transferred by a child apparatus to the frame size that is set by the parent apparatus.

Figure 5:
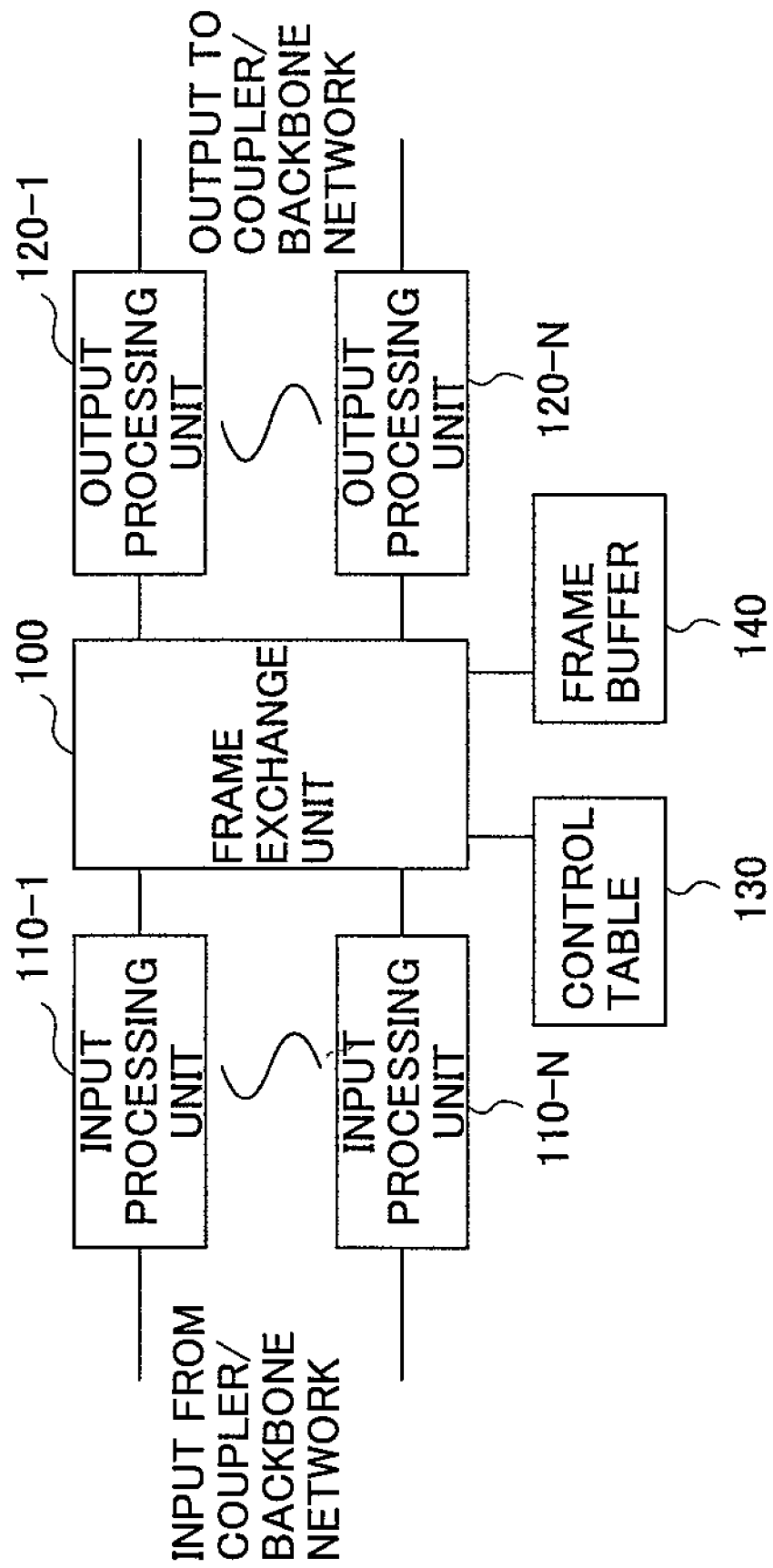
FIG. 5 is a block diagram showing a frame switch unit of a parent apparatus according to the embodiment of the present invention.

FIG. 5 is a block diagram showing the frame switch unit 10 of the parent apparatus according to the embodiment. Each input processing unit 110-1-110-N receives the frames provided by a plurality of child apparatuses through the circuit processing units 30a-30x and the frames provided by the channels connected to the backbone network 3.

The user frames received by the input processing units 110-1-110-N are transferred to a plurality of output processing units 120-1-120-N based on the destination address, the sender address field, and the control information, all indicated in the frame headers of the user frames. A control table 130 for exchanging user frames and a frame buffer 140 are connected to the frame exchange unit 100.

The frame buffer 140 is a memory circuit to temporarily store the user frames input from the input processing unit 110. The frame exchange unit 100 temporarily stores the user frames transferred from the input processing units 110 in the frame buffer 140 until the user frames are transferred to destinations indicated in the destination address fields and the control information fields of the user frames by reference to the control table 130. If necessary, the destination address field and the control information field are revised according to the control table 130.

Each output processing unit 120-1-120-N acquires only user frames stored in the frame buffer 140 that are addressed to itself and transmits the user frames to a coupler or the backbone network.

Figure 6:
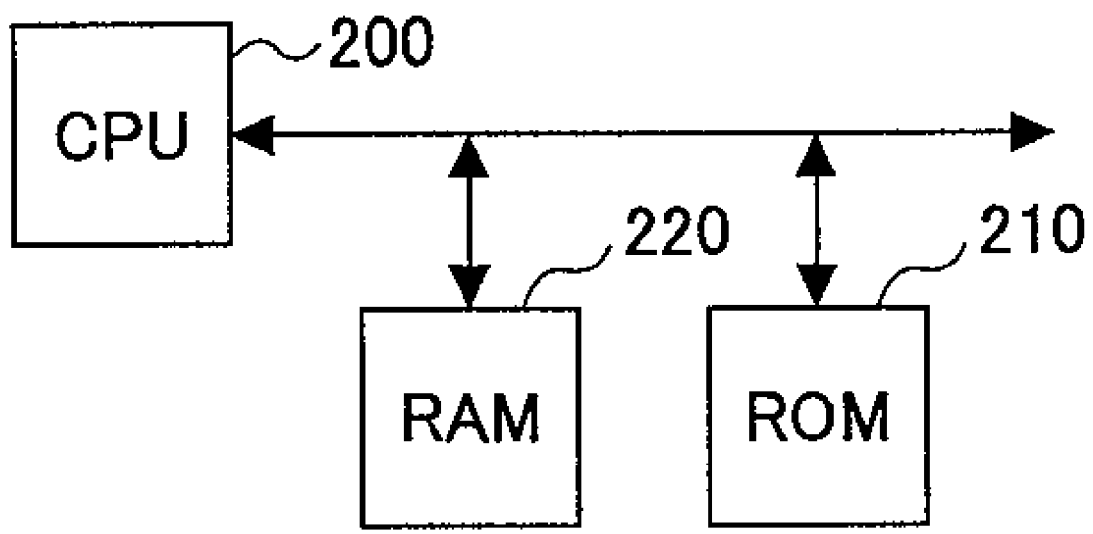
FIG. 6 is a block diagram showing a control unit of a parent apparatus according to the embodiment of the present invention.

FIG. 6 is a block diagram showing the control unit 20 according to the embodiment of the present invention. A CPU 200 is a processing circuit that executes a program stored in ROM 210. The CPU 200 uses RAM 210 as a working memory area.

Figure 7:
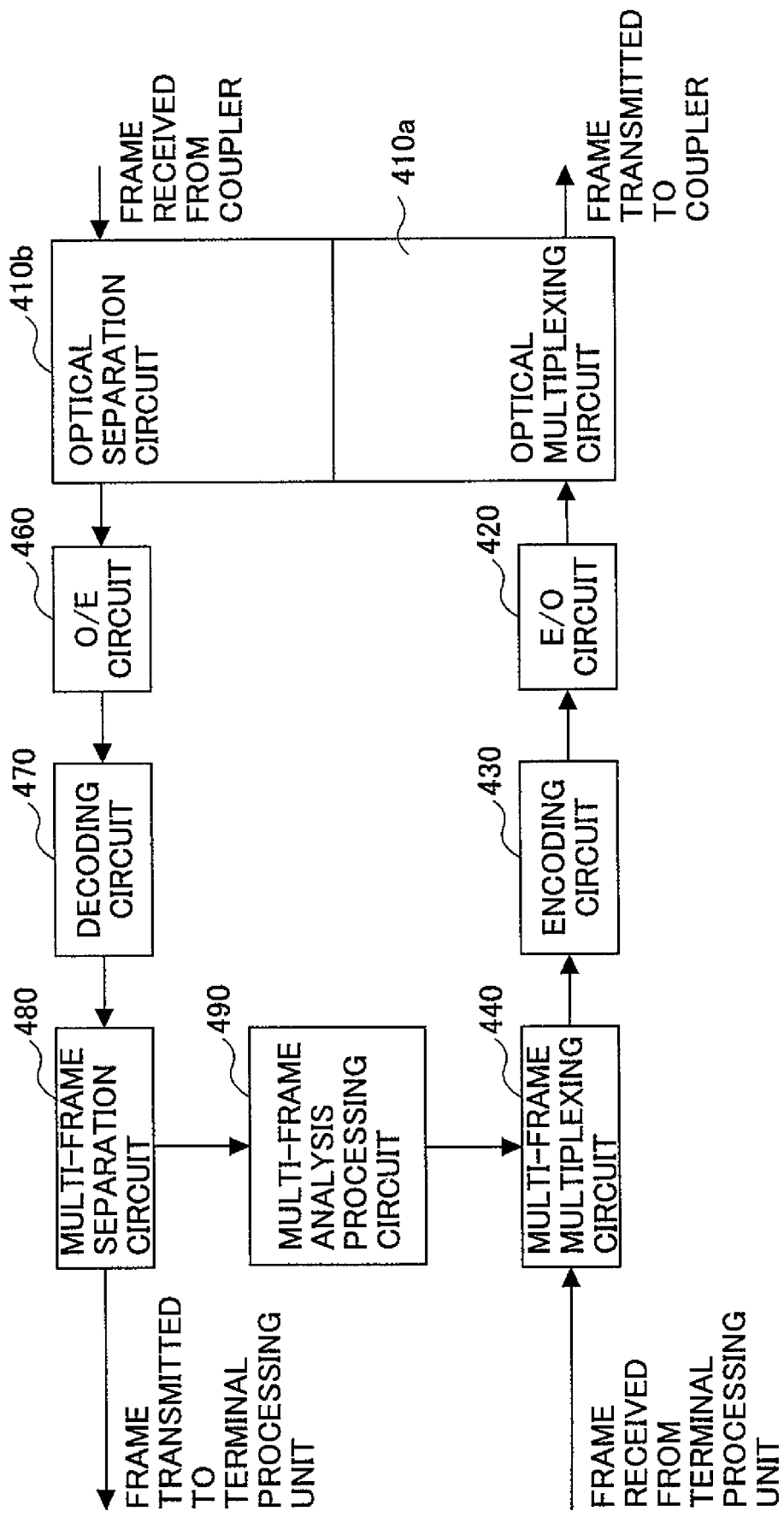
FIG. 7 is a block diagram showing a PON terminal unit of a child apparatus according to the embodiment of the present invention.

FIG. 7 is a block diagram showing the PON terminating unit 40 according the embodiment of the present invention. A downlink multi-frame is transferred through the upper portion of the block diagram showed in FIG. 7, and an uplink multi-frame is transferred through the lower portion of the block diagram showed in FIG. 7.

An optical separation circuit 410b selects only the optical signal received from the coupler and transfers the optical signal to an O/E circuit 460. The O/E circuit 460 converts the optical signal into an electric signal, and transfers the electric signal to a decoding circuit 470. The O/E circuit 460 separates a basic clock signal from the optical signal and separately transfers the basic clock signal to the decoding circuit 470.

The decoding circuit 470 decodes the encoded signal (4B/5B code or 8B/10B code, for example), detects the head position of the downlink multi-frame showed in FIG. 3B by identifying the head timing control field, and transfers the signal to a multi-frame separation circuit 480.

The multi-frame separation circuit 480 separates the user frame following the head timing control field and transfers the user frame to the terminal processing unit 50. The multi-frame separation circuit 480 reads a control header included in the head timing control field and, if necessary, transfers the control header to a multi-frame analysis processing circuit 490.

The multi-frame analysis processing circuit 490 performs complementary processing so that the coupler can transmit and/or receive the optical signal without fail. The complementary processing includes, for example, informing the parent apparatus of the timing information of the uplink communication of the child apparatus itself and compensating a gap at the coupler (ranging function). In the case that the control header included in the head timing control field indicates a command and the multi-frame analysis processing circuit 490 is required to respond to the parent apparatus, the multi-frame analysis processing circuit 490 transfers the response (or whatever necessary information) to a multi-frame multiplexing circuit 440.

On the other hand, user frames received from the terminal processing unit 50 are multiplexed by the multi-frame multiplexing circuit 440. The multiplexed user frames are transferred to an encoding circuit 430 at the timing designated by the parent apparatus based on the head timing control field as a reference.

The encoding circuit 430 encodes the uplink multi-frame provided by the multi-frame multiplexing circuit 440 and transfers the encoded signal to an E/O circuit 420. The E/O circuit 420 converts the electric signal into an optical signal, and transfers the optical signal to an optical multiplexing circuit 410a. The optical signal is transmitted to the same optical fiber as a receiving optical signal is received from after multiplexing using different wavelengths. The transmission is performed at the timing designated to the child apparatus based on the head timing control field as a reference.

Figure 8:
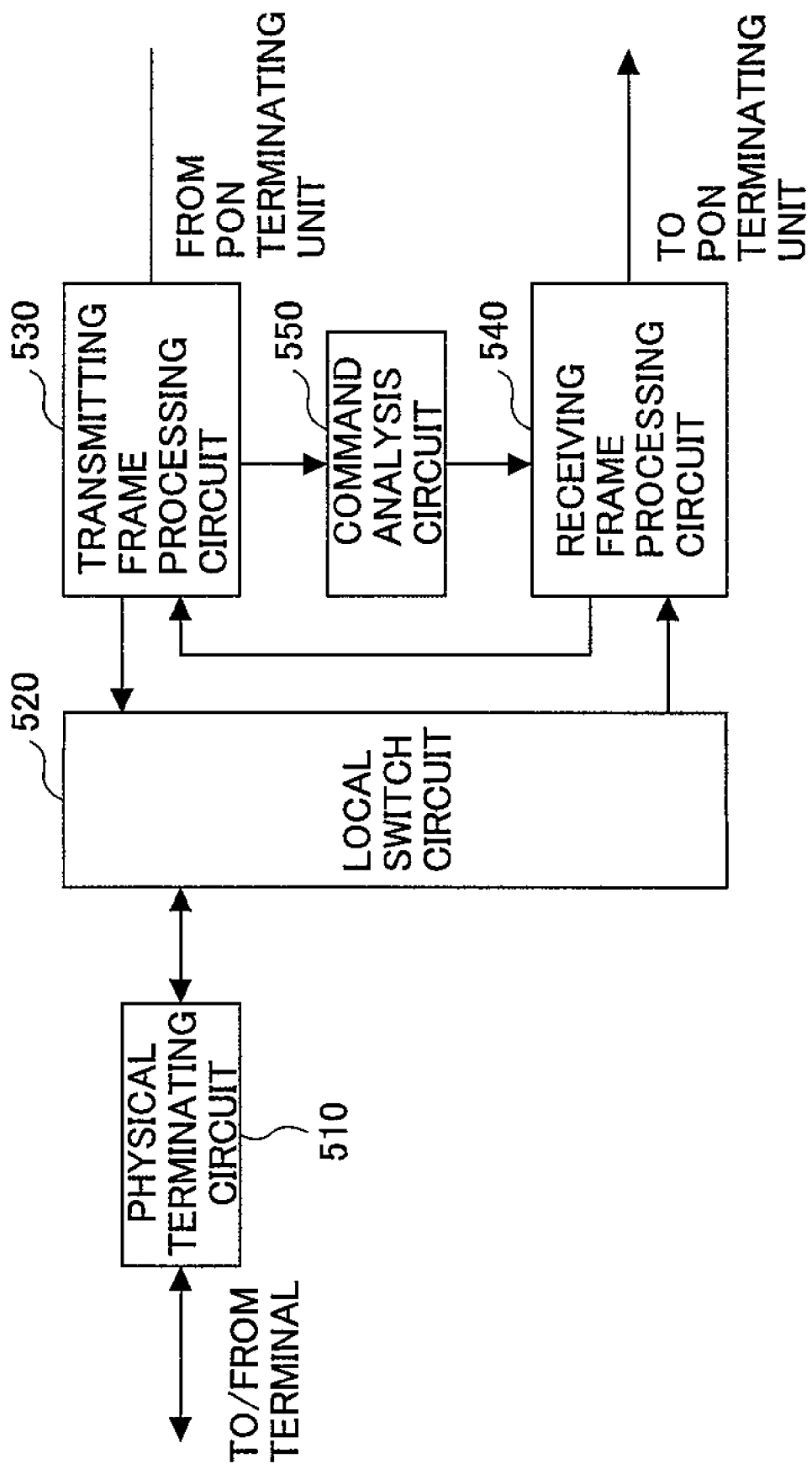
FIG. 8 is a block diagram showing a terminal processing unit of a child apparatus according to the embodiment of the present invention.

FIG. 8 is a block diagram of the terminal processing unit 50 according to the embodiment of the present invention. A transmitting frame processing circuit 530 receives a user frame sent from the multi-frame separation circuit 480 showed in FIG. 7, determines to which, the child apparatus itself in which the terminal processing unit 50 is provided or a terminal connected to the child apparatus itself, the user frame is addressed, and transfers the user frame to a local switch circuit 520. The transmitting frame processing circuit 530 ignores the user frame if the user frame is addressed to another child apparatus or the terminals connected to another child apparatus.

If the user frame is broadcasted, however, the transmitting frame processing circuit 530 regards the user frame as being addressed to the child apparatus itself in which the transmitting frame processing circuit 530 is provided, and transfers the user frame to the local switch circuit 520. The user frame addressed to the child apparatus itself in which the transmitting frame processing circuit 530 is provided is also transferred to a command analysis circuit 550.

A filter unit provided to the transmitting frame processing circuit 530 determines whether a multicasted user frame is addressed to any terminal connected to the child apparatus in which the transmitting frame processing circuit 530 is provided, and transfers the multicasted user frame addressed to the terminal through the local switch circuit 520.

The local switch circuit 520 transfers the user frame to a physical terminating circuit 510 to which the terminal addressed as the destination is connected. The physical terminal circuit 510 transmits the user frame to the addressed terminal.

On the other hand, the physical terminal circuit 510 receives a user frame sent by a user terminal, stores the user frame if the user frame is not for an internal communication between terminals connected to the same child apparatus, and transfers the stored user frame to the local switch circuit 520. The physical terminating circuit 510 informs the command analysis circuit 550 of the frame size of the stored user frame.

When a user frame addressed to a child apparatus is detected by the transmitting frame processing circuit 530 provided in the child apparatus, the command analysis circuit 550 provided in the child apparatus analyzes information indicated in the control field, the sender address field, and the data field, all included in the user frame, and performs various processings as being described below. If any response is to be returned, the command analysis circuit 550 generates a user frame and transfers the user frame to the receiving frame processing circuit 540.

The local switch circuit 520 transfers a user frame received from the physical terminal circuit 510 to the receiving frame processing circuit 540. The receiving frame processing circuit 540 receives a frame transferred from the local switch circuit 520 and/or the command analysis circuit 550, and transfers the frame to the multi-frame multiplex circuit 440 showed in FIG. 7.

The receiving frame processing circuit 540 is provided with an IGMP recognition unit that reads an HMR received from a terminal connected to the child apparatus to which the receiving frame processing circuit 540 is provided. The IGMP recognition unit registers the address of the terminal and the multicast group indicated in the HMR in the filter unit.

Figure 9:
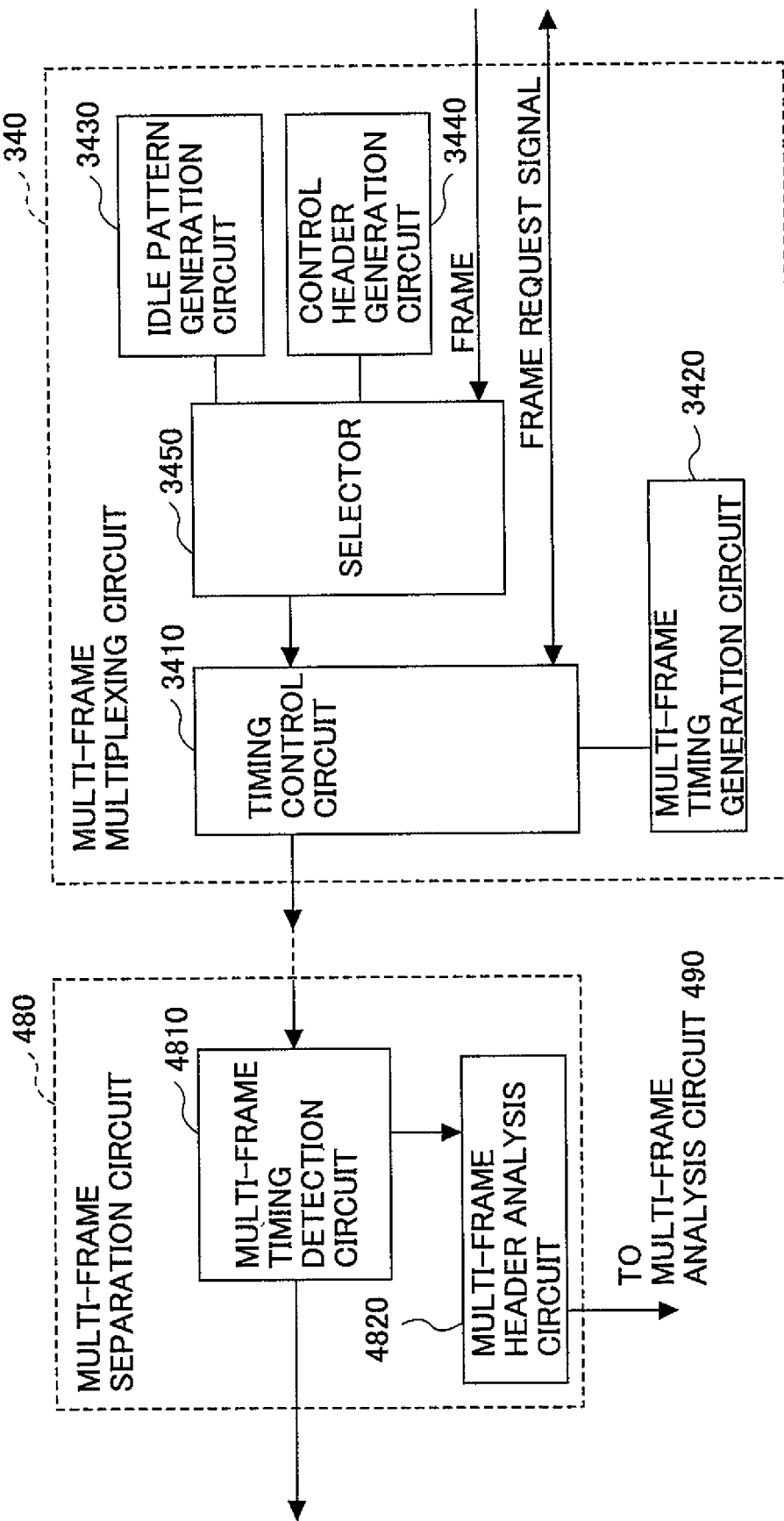
FIG. 9 is a block diagram of a multi-frame multiplexing circuit of a parent apparatus and a multi-frame separation circuit of a child apparatus that jointly realize a downlink multi-frame according to the embodiment of the present invention.

FIG. 9 is a block diagram showing a multi-frame multiplexing circuit 340 and a multi-frame separation circuit 480 that jointly realize the generating of a downlink multi-frame. In the multi-frame multiplexing circuit 340, a multi-frame timing generation circuit 3420 provides a timing signal, of which cycle time is equal to the cycle time of the head timing control field, to a timing control circuit 3410.

The cycle time of the downlink multi-frame is determined by the timing signal. A head timing control field showed in FIG. 3B is read out from a control header generation circuit 3440 in synchronization with the timing signal. In the case that a user frame is provided by one of the output processing units showed in FIG. 5, 120-1, for example, the user frame is attached in the rear of the head timing control field and a signal (delimiter) attached thereto to indicate a partition between two consecutive frames and transferred. If no frame is provided by the output processing units, an idle pattern is provided by an IDLE pattern Gilt generation circuit 3430.

If the output processing unit 120-1 informs the multi-frame multiplexing circuit 340 of the existence of a user frame to be transferred, the multi-frame multiplexing circuit 340 determines whether the user frame is short enough to transfer within the timing of transferring a user frame. If the user frame is short enough, the user frame is transferred after being attached to a separation signal.

The output processing unit 120-1 informs the timing control circuit 3410 of the existence of the user frame to be transferred and the frame size of the user frame. The timing control circuit 3410 controls the timing of transferring the user frame by determining whether the user frame is short enough, and requesting the output processing unit 120-1 to transfer the user frame at the time at which the timing control circuit 3410 can transfer.

Besides the procedure described above, the user frame provided by the output processing unit 120-1 can be stored in a buffer of the timing control circuit 3410. The buffered user frame is transferred regardless of its frame size. When the next timing signal is provided, the transferring of the user frame is temporarily stopped. The remaining portion of the user frame is sent after the head timing control field provided the next timing. It is possible to increase the efficiency of the PON communication in this way.

A selector circuit 3450 selects one of the IDLE pattern generation circuit 3430, a control header generation circuit 3440, and the output processing unit 120-1 in response to an indication from the timing control circuit 3410 and provides the user frame of the selected one to the timing control circuit 3410.

Figure 10:
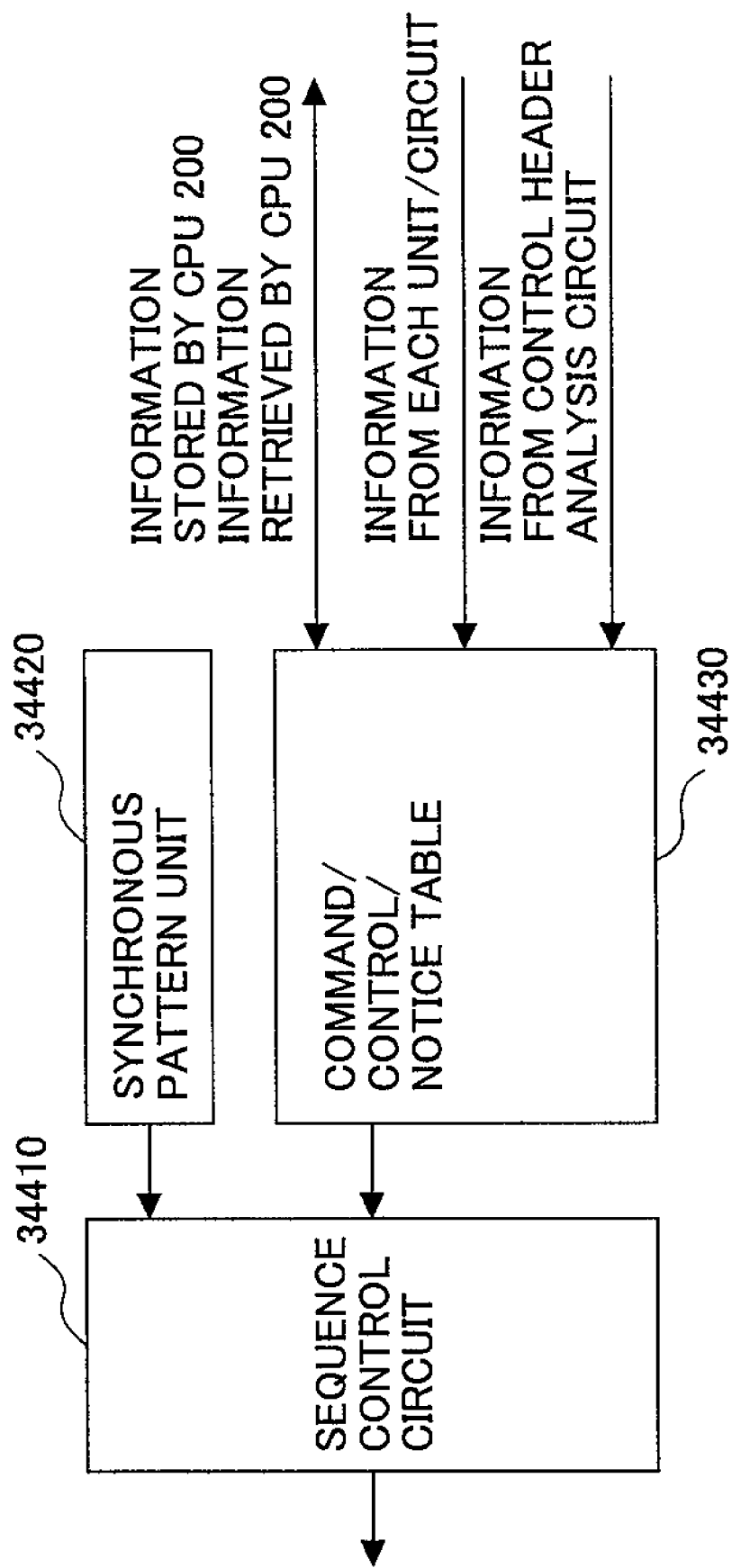
FIG. 10 is a block diagram showing a control header generation circuit according to the embodiment of the present invention.

The control header generation circuit 3440 is structured as showed in FIG. 10. A control header includes information such as an instruction to an individual child apparatus connected to the PON, control information provided to individual terminals connected to the child apparatus, control information to control the PON layer of the entire network, information of the states of the PON layer, and diagnostic information between a parent apparatus and a child apparatus.

A sequence control circuit 34410 first transfers a synchronous pattern of the head timing control field provided by a synchronous pattern unit 34420 to the timing control circuit 3410 based on the timing provided by the timing control circuit 3410. Then, the sequence control circuit 34410 transfers the information provided in a command/control/notice table 34430.

The information provided in the command/control/notice table 34430 includes information such as predetermined information set by the software program executed by the CPU 200 in the control unit 20, information exchanged between a parent apparatus and a child apparatus, and information obtained by a parent apparatus to check receiving conditions, for example. The information provided in the command/control/notice table 34430 is also revised dynamically by the software program executed by the CPU 200 to perform various controls.

As showed in FIG. 11, the predetermined information includes a child apparatus number, a delay time, a designated band, and commands. The delay time is measured when the network system is set up by the parent apparatus 1 by requesting the child apparatuses to send statistical information and measuring a time period until the parent apparatus 1 receives responses from the child apparatuses. The parent apparatus informs the child apparatuses of the measured delay time so that the child apparatuses can decide the timing of transmitting the user frames more accurately.

The left side of FIG. 9 shows the block diagram of the multi-frame separation circuit 480 of the PON terminal unit 40. A multi-frame timing detection circuit 4810 detects the synchronous pattern of the head timing control field of the downlink multi-frame generated by the timing control circuit 3410, and determines whether the frame following the head timing control field is an effective frame. The effective frame means a signal, which is not an idle pattern, following the head timing control field that is separated by a frame separation code in the front and a frame end code in the rear. The head timing control field may be inserted between the frame separation code and the frame end code depending on the manner in which the multi-frame multiplex circuit 340 is designed.

The decoding circuit 470 of the child apparatus detects the head timing control field by detecting a unique pattern contained in the head timing control field as the synchronous pattern. The unique pattern must be selected from the patterns that the encoding circuit 330 does not generate as a result of encoding. The detected signal is transferred to the multi-frame timing detection circuit 4810 provided in the multi-frame separation circuit 480.

For example, the child apparatus can determine whether a downlink multi-frame has been established by checking that the unique pattern has been detected once or more than once at a constant cycle time continuously. Similarly, the child apparatus determines whether the downlink multi-frame is discharged by checking, while the downlink multi-frame has been established (the child apparatus has been detecting the unique pattern regularly), that the unique pattern has not been detected once or more than once continuously.

The effective downlink multi-frame is transferred to the transmitting frame processing unit 530 provided in the terminal processing unit 50 showed in FIG. 8. The control header of the head timing control field is sent to the multi-frame header analysis circuit 4820. The multi-frame header analysis circuit 4820 transfers the information contained in the control header of the head timing control field to the multi-frame analysis processing circuit 490.

Figure 12:
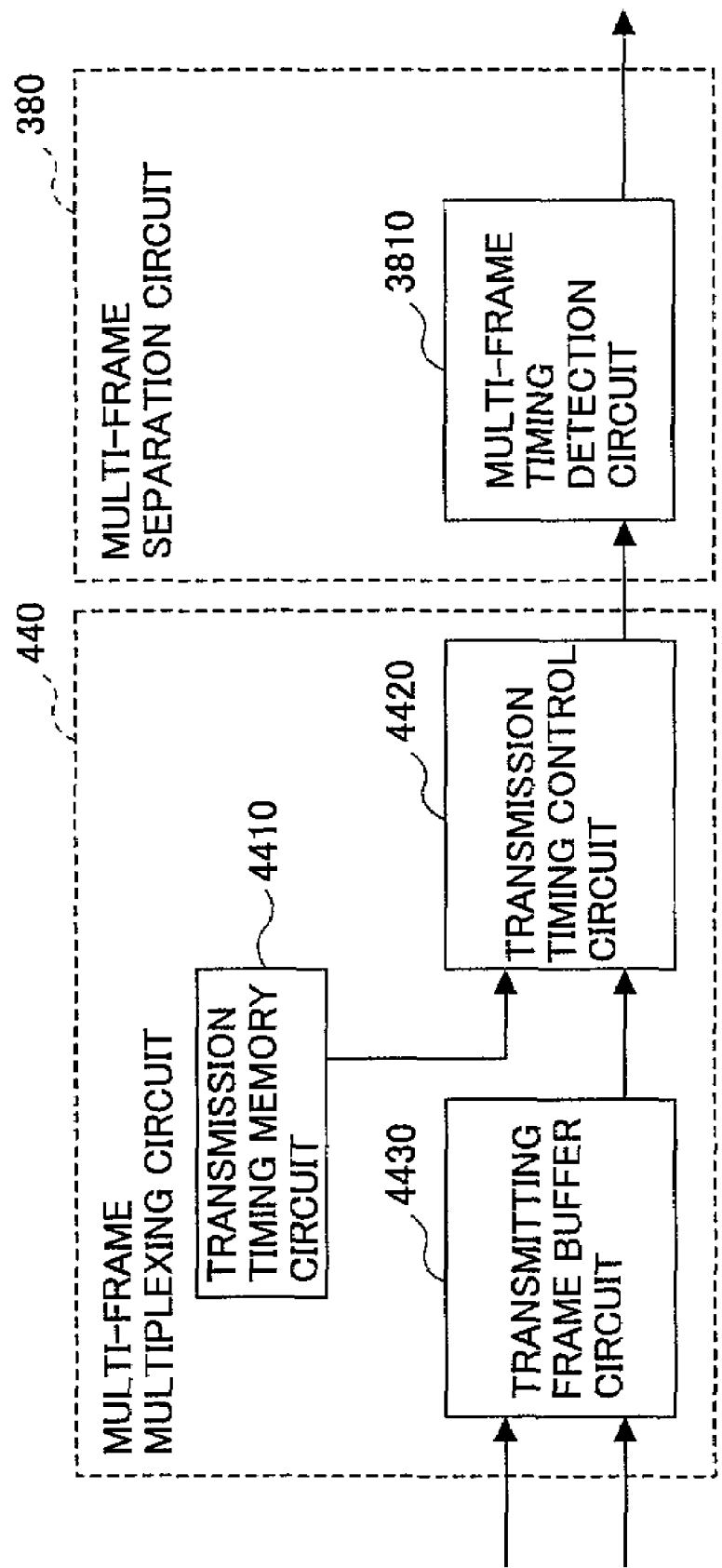
FIG. 12 is a block diagram showing a multi-frame separation circuit of a parent apparatus and a multi-frame multiplexing circuit of a child apparatus that jointly realize an uplink multi-frame according to the embodiment of the present invention.

FIG. 12 is a block diagram showing a circuit that realizes the uplink multi-frame consisting of the multi-frame separation circuit 380 and the multi-frame multiplex circuit 440. The operation of the circuit showed in FIG. 12 is essentially the same as the circuit that realizes the downlink multi-frame showed in FIG. 9. The timing of the multi-frame timing detection circuit 3810 is determined by the phase difference from the frame timing (the head timing control field) of the downlink multi-frame.

A transmitting timing memory circuit 4410 in the multi-frame multiplexing circuit 440 of the child apparatus stores information about the transmission timing that is provided as the delay time in the third item of the predetermined information through the downlink and the transmission size of the child apparatus. A transmitting frame buffer circuit 4430 consists of a frame buffer that temporarily stores user frames provided by the receiving frame processing circuit 540 showed in FIG. 8 and a control information buffer that stores control information (the control information C1-Cn showed in FIG. 3C) provided by the multi-frame analysis processing circuit 490 showed in FIG. 7. The transmitting frame buffer circuit 4430, in response to a request from a transmission timing control circuit 4420, transfers an uplink multi-frame by consecutively retrieving the control information Cn stored in the control information buffer and the user frame stored in the frame buffer.

Figure 13:
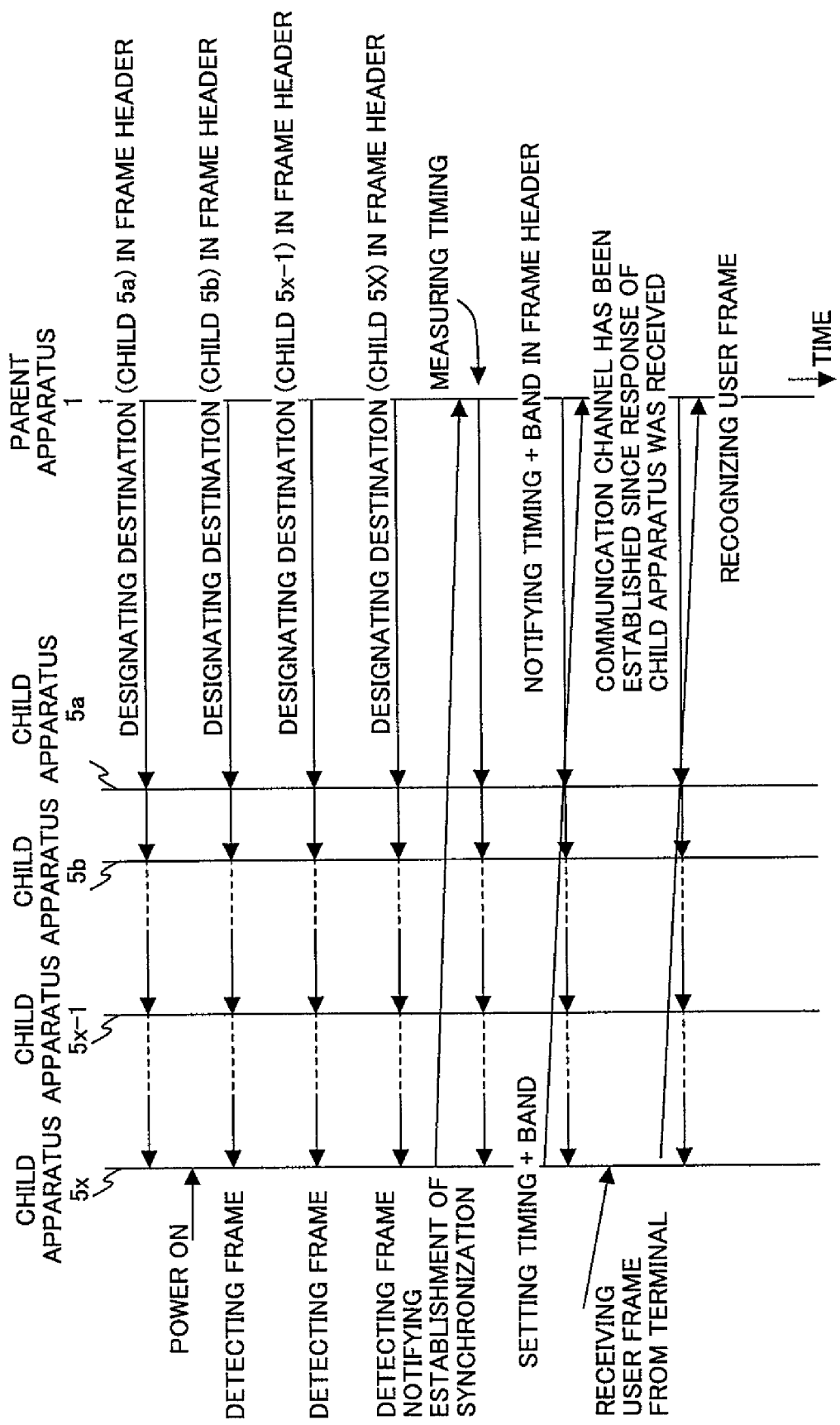
FIG. 13 is a sequence diagram of a PON communication when a parent apparatus and a child apparatus begin the PON communication according to the embodiment of the present invention.

FIG. 13 is a sequence diagram of a PON communication between a parent apparatus and a child apparatus when the PON communication starts. The parent apparatus 1 designates the child apparatus 5a in the control header of the head timing control field of the downlink multi-frame, and requests the child apparatus 5a to establish synchronization. Similarly, the parent apparatus 1 designates child apparatuses 5b-5x one after another and requests them to establish synchronization. The child apparatus 5x, when it detects a synchronous pattern in the head timing control field of the received downlink multi-frame and establishes synchronization after being switched on, informs the parent apparatus 1 that the child apparatus 5x has established synchronization by indicating in the head timing control field of the uplink multi-frame.

Using this information about the synchronization of the child apparatus 5x, the parent apparatus 1 measures the delay time of the child apparatus 5x and transmits a command to set the transmission timing and transmission band (frame size) of the child apparatus 5x by providing the command in the control header of the head timing control field. When the child apparatus 5x responds to the command sent by the parent apparatus 1 using the head timing control field of the uplink multi-frame, the communication between the parent apparatus 1 and the child apparatus 5x is established.

As described above, the present invention improves the efficiency of the PON communication network by transferring asynchronous information, as it is, provided by the information sources. Though the present invention utilizes time sharing multiplexing method to avoid data collision in the uplink channel, the efficiency of the PON communication network according to the present invention can be improved by expanding the unit of time sharing and multiplexing a plurality of pieces of asynchronous information in the unit of time sharing.

Furthermore, asynchronous information is converted into a frame of a variable length in order to simplify the function of the child apparatuses. That is, the function of the child apparatuses can be simplified because variable-length frames are multiplexed, as they are, in the unit of time domain multiplexing. The child apparatuses require only functions such as a terminating function of time domain multiplexing PON (from the child apparatus to the parent apparatus) and a separating function of frames addressed to the child apparatus itself from a multiplexed information, and accordingly the child apparatuses are greatly simplified.

Figure 14:
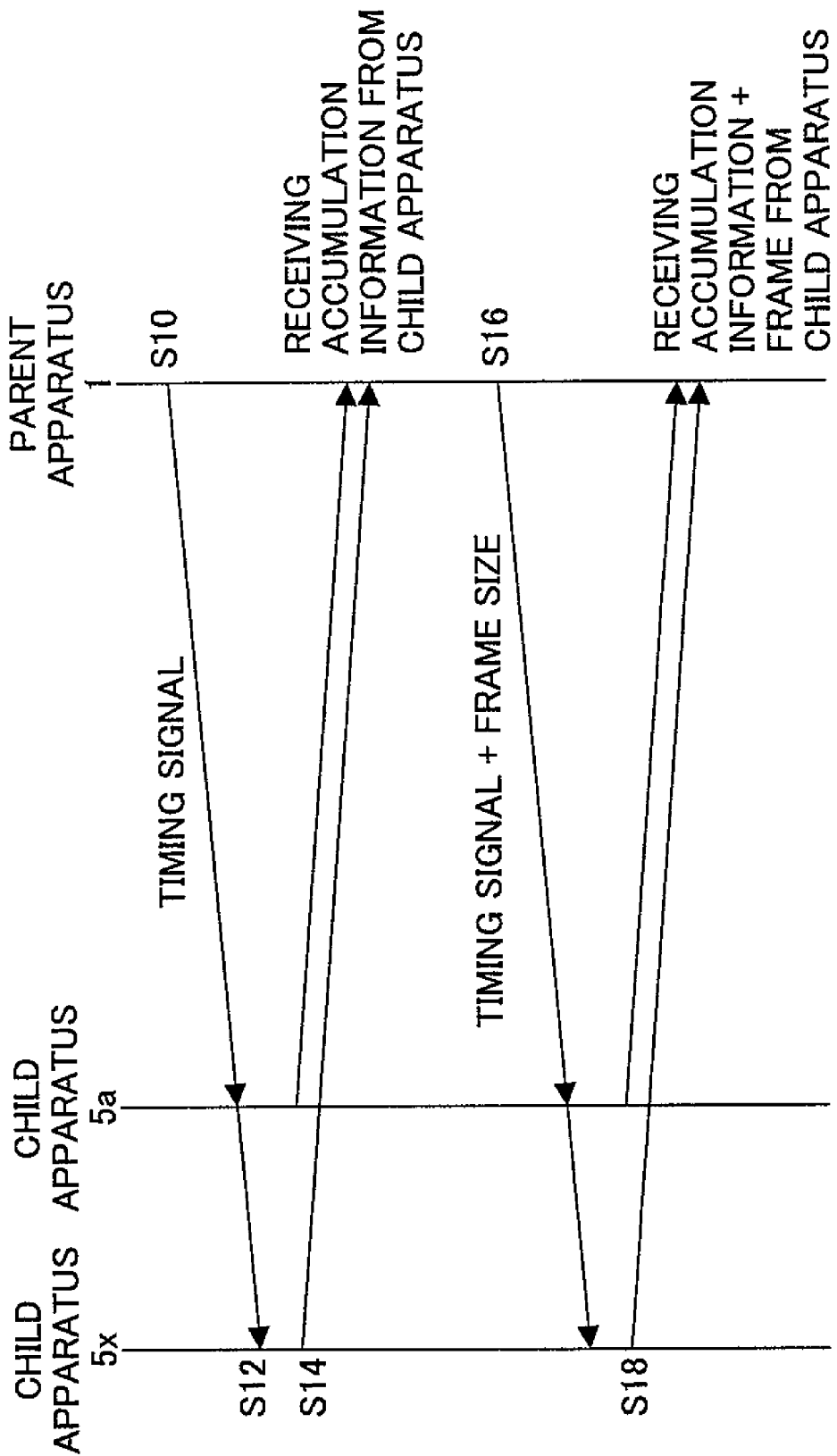
FIG. 14 is a sequence diagram of a PON communication when a parent apparatus collects frame accumulation information from child apparatuses according to the embodiment of the present invention.
Figure 15:
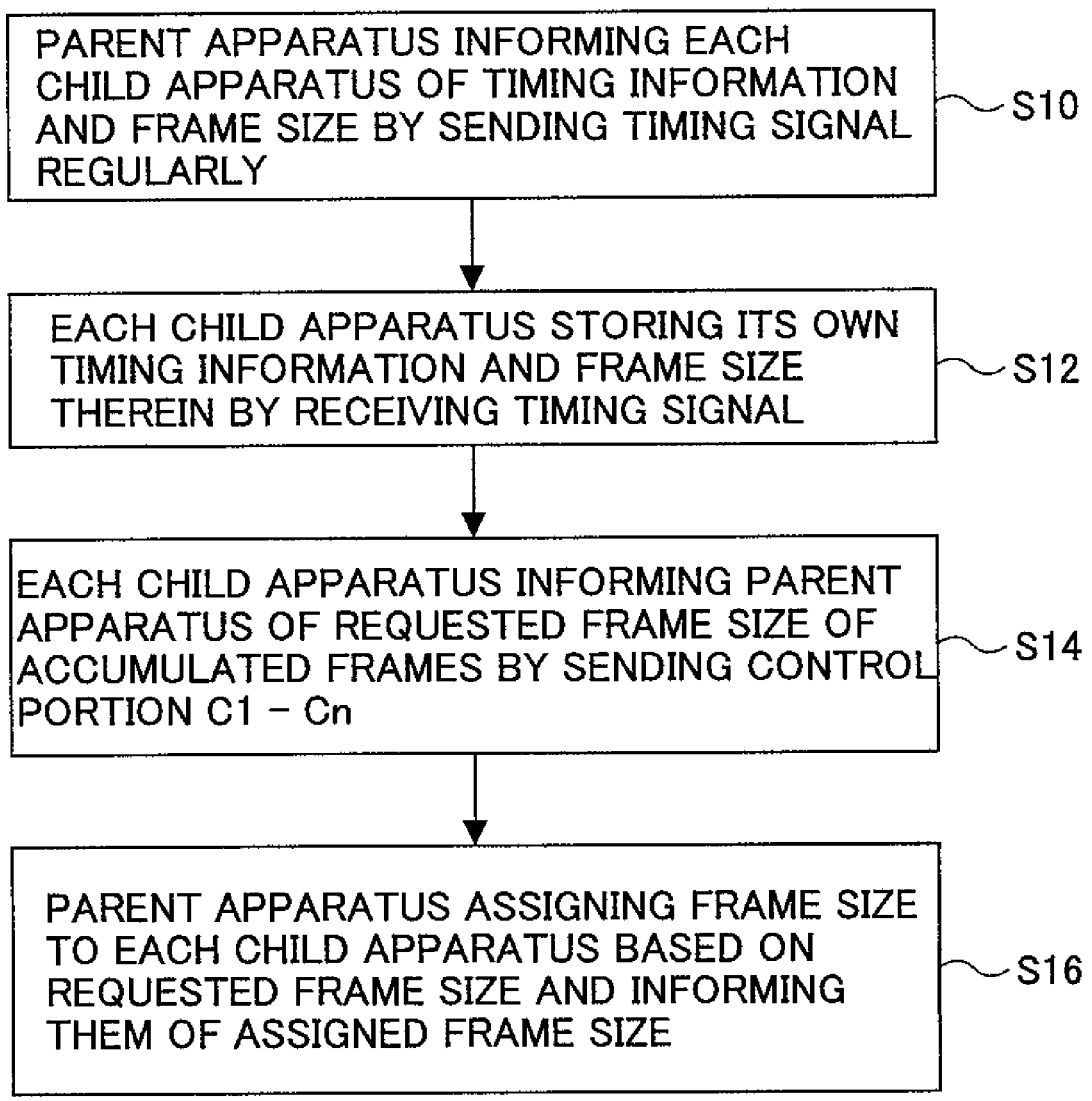
FIG. 15 is a flow diagram of a PON communication when a parent apparatus collects frame accumulation information from child apparatuses according to the embodiment of the present invention.

FIG. 14 is a sequence diagram showing the sequence of collection of frame accumulation information, and FIG. 15 is a flow diagram showing the processing of collection of frame accumulation information. The parent apparatus 1 informs each child apparatus 5a-5x of an uplink timing (a delay time from the head timing control field of the uplink multi-frame to multiplex user frames sent by child apparatuses) and uplink frame size designated to each child apparatus using the control header of the downlink multi-frame regularly sent to the child apparatuses (Step S10). This information is transferred in a cycle time 10 to 100 times that of the head timing cycle.

Each child apparatus learns its own uplink timing and uplink frame size and memorizes them. Each child apparatus 5a-5x stores frames transferred by terminals connected to the child apparatus in the multi-frame multiplexing circuit 440. Each child apparatus 5a-5x informs the parent apparatus 1 of the frame size of the stored frames using the control information (C1-Cn) of uplink multi-frame (Step S14).

The multi-frame multiplexing circuit 340 of the parent apparatus 1 learns an uplink frame size that is requested by each child apparatus 5a-5x by reading the control information (C1-Cn) of the uplink multi-frame, and determines an uplink frame size, which is to be provided at the next regular timing signal, to be assigned to each child apparatus (Step S16).

Each child apparatus 5a-5x transfers user frames, of uplink frame size assigned by the parent apparatus 1, stored therein to the parent apparatus 1 at the uplink timing assigned by the parent apparatus 1 (Step S18).

As described above, the PON according to an embodiment of the present invention can efficiently multiplex user frames accumulated in each child apparatus 5a-5x because each child apparatus 5a-5x informs the parent apparatus 1 of requested uplink frame size and the parent apparatus 1 determines an uplink frame size assigned to each child apparatus.

Figure 16:
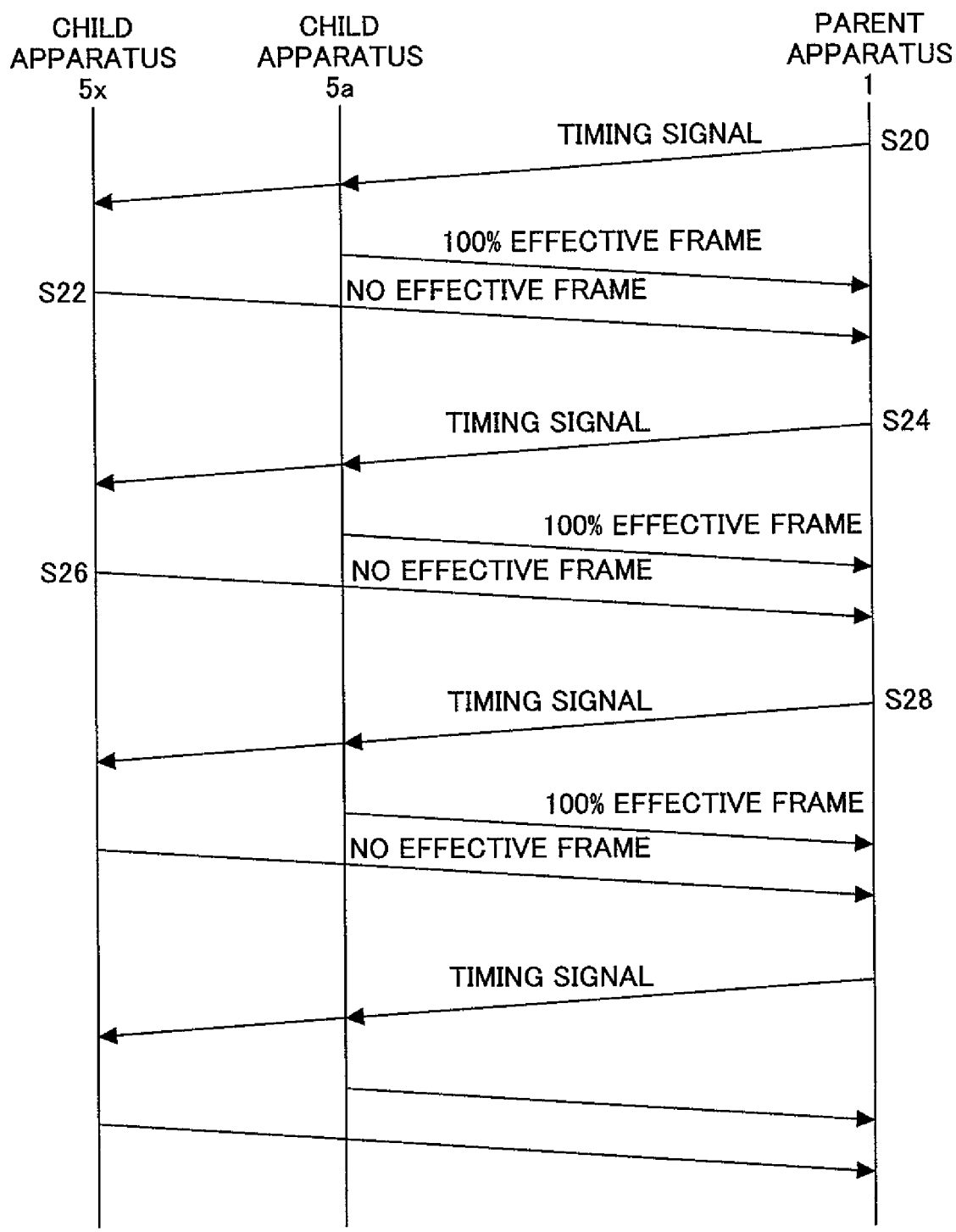
FIG. 16 is a sequence diagram of a PON communication when a parent apparatus collects frame accumulation information from child apparatuses according to the embodiment of the present invention.

FIG. 16 is a sequence diagram showing the collection of frame accumulation information. The parent apparatus 1 informs each child apparatus 5a-5x of assigned uplink timing and uplink frame size (Step S20 and 524). Each child apparatus 5a-5x transfers user frames of the assigned uplink frame size at the assigned uplink timing to the parent apparatus 1 (Step S22 and S26).

The multi-frame multiplexing circuit 340 of the parent apparatus 1 increases the assigned uplink frame size if the effective frame rate of each child apparatus 5a-5x measured by the statistics circuit 3910 is greater than a predetermined upper limit (80%, for example) more than a predetermined number of times (2 times, for example) (Step S28). The effective frame rate is the percentage of the frame size actually transferred by the child apparatus to the uplink frame size assigned by the parent apparatus 1. The multi-frame multiplexing circuit 340 of the parent apparatus 1 decreases the uplink frame size assigned to a child apparatus if the effective frame rate is smaller than a predetermined lower limit (20%, for example) more than a predetermined number of times (2 times, for example). The uplink frame size is increased or decreased by the indication in the head timing control field of the downlink multi-frame.

It is possible to dynamically change the band (frame size) by controlling only the parent apparatus 1, which results in an efficient multiplexing of the user frames.

Figure 17:
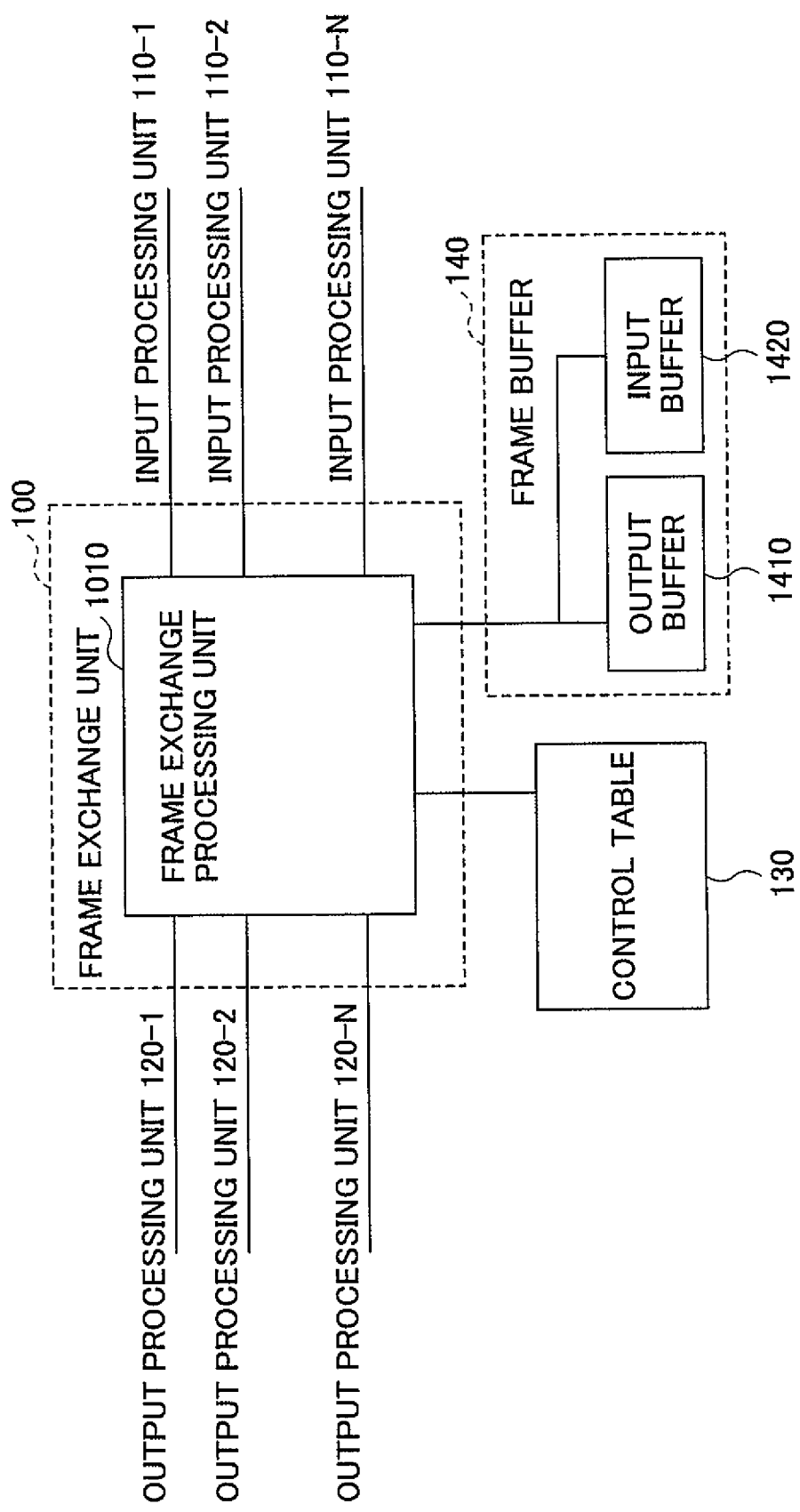
FIG. 17 is a block diagram of a frame exchange unit and its peripheral units with which a parent apparatus guarantees a minimum rate to a child apparatus according to the embodiment of the present invention.

FIG. 17 is a block diagram of the frame exchange unit 100 and its peripheral units that enables the parent apparatus to guarantee the minimum rate of the child apparatus. The frame exchange processing unit 1010 in the frame exchange unit 100 exchanges user frames provided by a plurality of input processing units 110-1-110-N in the order indicated by a control table 130. A frame buffer 140 is provided with an input buffer 1420 and an output buffer 1410. The input buffer 1420 is a waiting queue of user frames, corresponding to each input processing unit 110-1-110-N, in which the user frames wait for a scheduling processing performed by the frame exchange processing unit 1010. The output buffer 1410 is another waiting queue of user frames, scheduled by the frame exchange processing unit 1010, in which the scheduled user frames wait to be transferred to each output processing unit 120-1-120-N.

FIG. 18 is an example of the control table 130. In the control table 130, an output processing unit is assigned to each input processing unit depending on the destination address, the sender address, and the control type. The numeral in parentheses is a queue number in the output buffer provided to each output processing unit.

Figure 19:
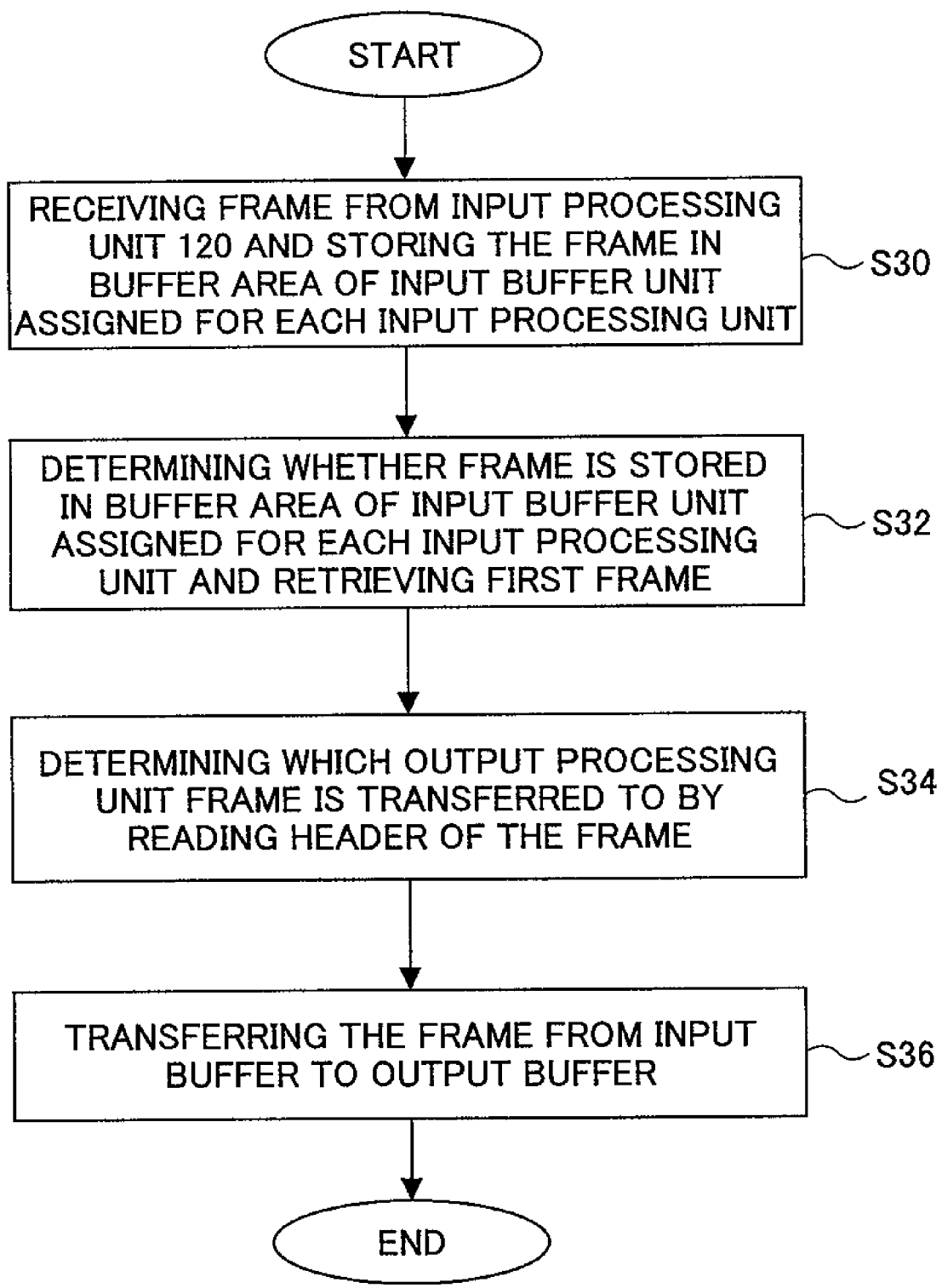
FIG. 19 is a flow diagram showing input processing of a frame exchange processing unit 1010 according to the embodiment of the present invention.

FIG. 19 is a flow diagram showing an input processing of the frame exchange processing unit 1010. The frame exchange processing unit 1010 receives the user frames transferred from the input processing unit 120, and stores the user frames in an input buffer 1420 provided for each input processing unit (Step S30).

Next, the exchange processing unit 1010 determines whether a user frame is stored in the input buffer 1420 provided to each input processing unit and separates the user frame located at the head of the user frames (Step S32). The exchange processing unit 1010 assigns an output processing unit by comparing the frame header of the user frame separated in the previous step with the control table 130 (Step S34), and transfers the user frame to the output buffer 1410 corresponding to the output processing unit (Step S36).

By the way, in the output buffer 1410, the user frames of which number is indicated in parentheses showed in FIG. 18 are waiting in the queues. If each output queue has user frames of which number is equal to the number of the child apparatuses or the number of the terminals connected to the child apparatuses, it is possible to guarantee a minimum output rate of each output queue by equally allowing each output queue to output. Furthermore, it is possible to output the user frames from each output queue at a constant cycle time measured by a timer.

Figure 20:
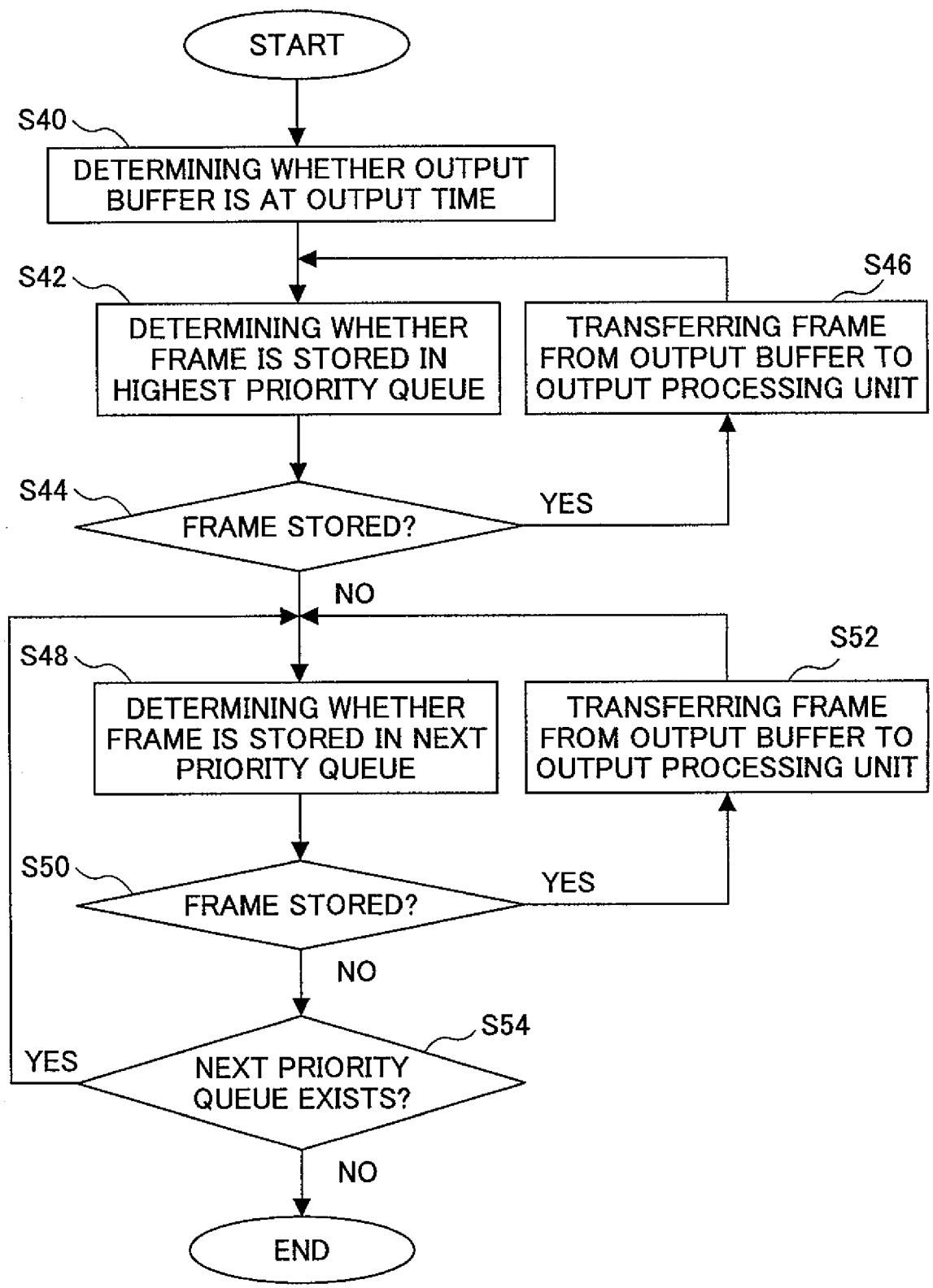
FIG. 20 is a flow diagram showing priority output processing of the frame exchange processing unit 1010.

FIG. 20 is a flow diagram showing the priority output processing of the frame exchange processing unit 1010. When the output time of the output buffer 1410 comes (S40), the frame exchange processing unit 1010 determines whether a user frame is stored in the highest priority output queue of the output buffer 1410 (S42). If a user frame exists in the queue (S44), the user frame is transferred to the output processing unit (S46). The step S42 is repeated. If no user frame is stored (S44), the step S48 is performed next.

The frame exchange processing unit 1010 checks whether a user frame is stored in the next priority queue of the output queues in the output buffer 1410 (S48). If there is a user frame in the queue (S50), the user frame is transferred to the output processing unit (S52). Then, the step S48 is repeated. If no user frame is stored in the next priority queue (S50), the frame exchange processing unit 1010 further checks whether any queue having the next priority exists (S54). If the next priority queue exists, the step S48 is repeated. If no queue having the next priority exists, the processing is finished.

In the above embodiment, each output queue is provided with a priority level. If a plurality of output queues has the same priority level, the output queue from which user frames are output has the lowest priority. Accordingly, any output queue having the same priority level can have a transmitting right.

Since the user frames according to the present invention are of variable length, the band depends on the frame size of the user frames. If the frame size of a user frame is longer, it seems the user frame is provided with a wider band. In the next embodiment, even if a user frame having a longer frame size is being transferred, a user frame having a higher priority can interrupt the transfer of the user frame having a longer frame size but a lower priority. If an interruption of a user frame having a higher priority is requested, the transfer of the user frame having a longer frame size is interrupted, and the user frame having a higher priority is transferred first. After the user frame having a higher priority is transferred, the remaining portion of the user frame having a lower priority is transferred. Accordingly, the transfer of a high priority user frame at a minimum rate is guaranteed.

As described above, the transfer of a lower priority user frame is interrupted by an interruption by a higher priority user frame. If a transfer of an even higher priority user frame is requested while the higher priority user frame is transferred, the transfer of the higher priority user frame is interrupted and the even higher priority user frame is transferred. After the transfer of the even higher priority user frame is finished, the remaining portion of the higher priority user frame is transferred. After the transfer of the higher priority user frame is finished, then the remaining portion of the lower priority user frame is transferred. This is called a nesting transfer.

Figure 21:
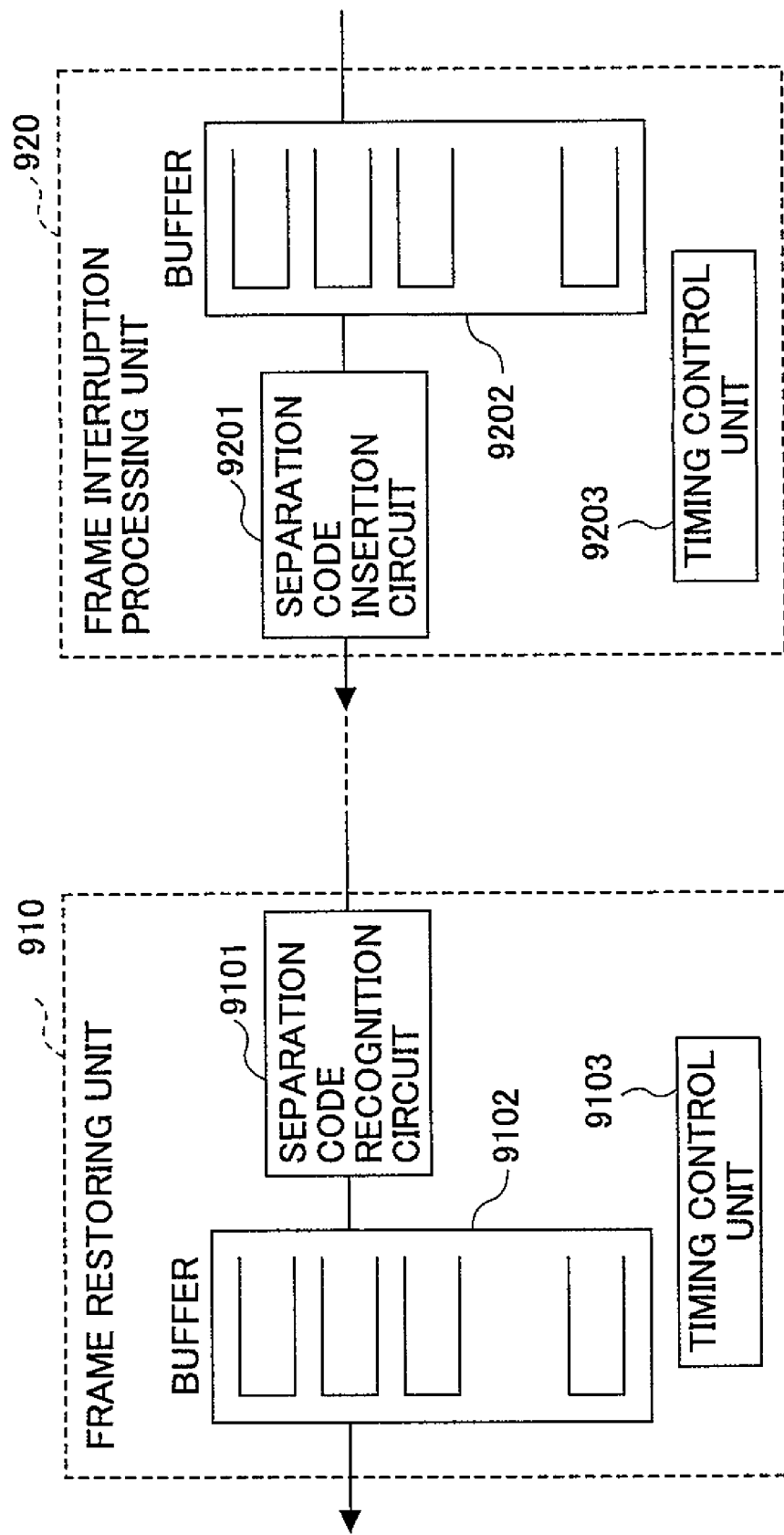
FIG. 21 is a block diagram of a frame interruption processing unit of a parent apparatus and a frame reproduction unit of a child apparatus according to the embodiment of the present invention.

FIG. 21 is a block diagram of a circuit that realizes priority transfer processing. A frame interruption processing unit 920 realizes the interruption of the frame transfer, and a frame restoring unit 910 realizes the restoring of the interrupted frame into the original user frame. The frame interruption processing unit 920 is provided in the frame exchange unit 100, and performs the frame interruption processing just before the user frame is transferred to the output processing unit 110. The frame restoring unit 910 is provided in the transmitting frame processing circuit 530 showed in FIG. 8.

In the frame interruption processing unit 920, buffers 9202, of which number is the number of nesting of each uplink multi-frame and downlink multi-frame, are provided, and the remaining portion of the interrupted user frame is stored in the buffer. The frame restoring unit 910 is provided with buffers 9102 of which number is equal to that of the buffers 9202, that is the number of nesting of each uplink multi-frame and downlink multi-frame.

The first user frames, on which the frame exchange processing has been performed in accordance with the control table 130 connected to the frame exchange processing unit 1010, in a plurality of queues of the output buffer 1410 are transferred to the frame interruption processing unit 920, and stored in the buffer 9202. The buffer 9202 transfers the user frames stored in a higher priority buffer.

If no user frame is stored in the higher priority buffer, the user frame stored in the lower priority buffer is transferred. If a user frame is stored in a higher priority buffer while the user frame stored in the lower priority buffer is being transferred, the frame interruption processing unit 920 sets an interruption flag on the head of the user frame of the higher priority buffer 9202, the frame interruption processing unit 920 interrupts the transfer of the lower priority frame and starts the transfer of the frame stored in the higher priority buffer. After the transfer of the higher priority frame is finished, the remaining portion of the lower priority frame that has been interrupted is resumed. This processing is controlled by a timing control unit 9203.

If a separation code recognition circuit 9101 of the frame restoring unit 910 detects the interruption flag while it is receiving user frames, the separation code recognition circuit 9101 chooses a buffer having a higher priority than the buffer in which the receiving user frame is stored, learns that a new user frame is received, and memorizes that the transfer of a user frame is interrupted. When the receipt of the new user frame is finished, the memory of the interrupted user frame is retrieved, and restores the user frame having a lower priority by transferring the received user frame to the interrupted buffer. A timing control unit 9103 controls this processing.

Figure 22:
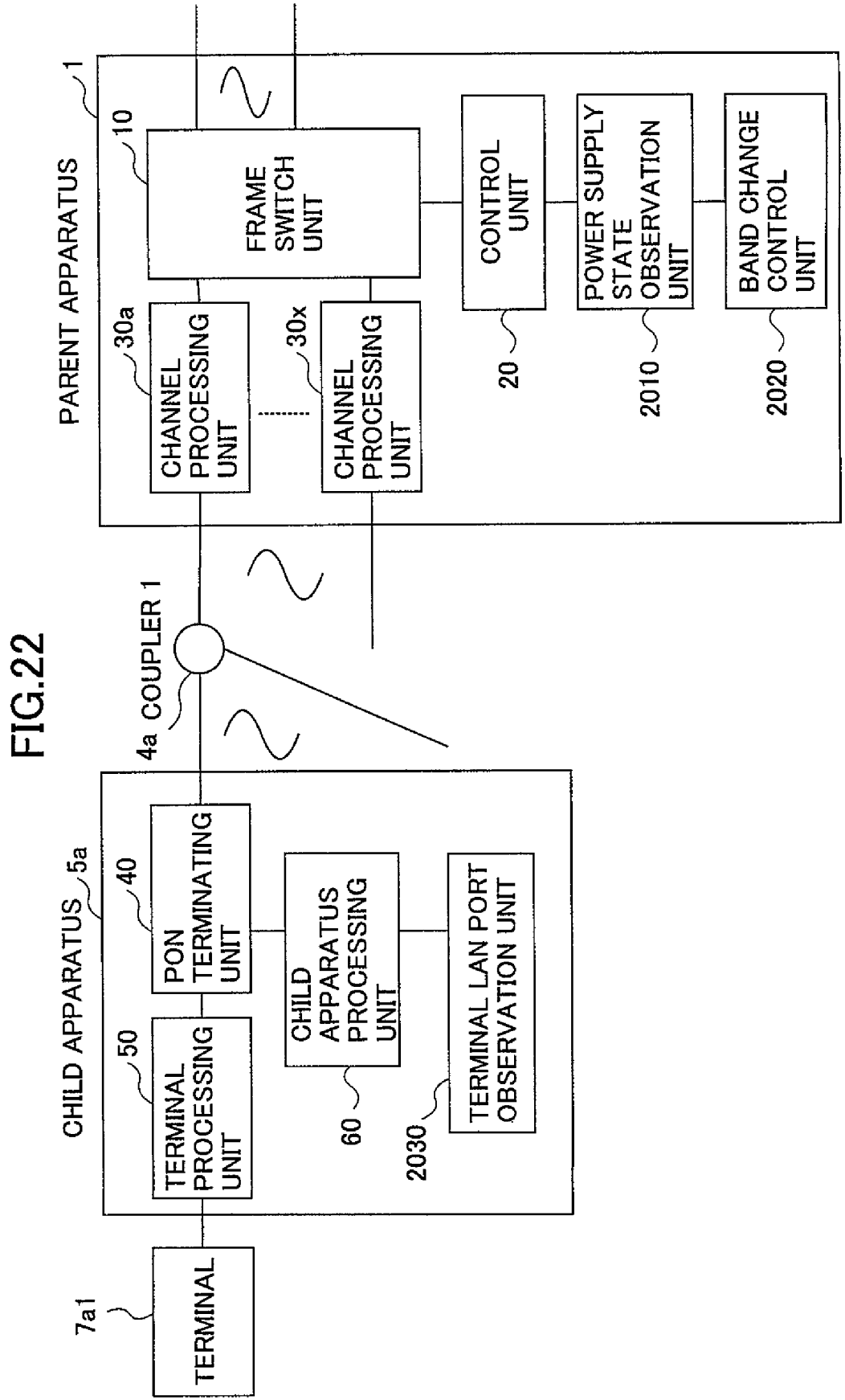
FIG. 22 is a block diagram showing a parent apparatus and a child apparatus that realize band dynamic control according to the embodiment of the present invention.

FIG. 22 is a block diagram showing a circuit structure that realizes a band dynamic control. In FIG. 22, the components identical to those showed in FIG. 2 are referred to by the same numeral. A description of the common components is omitted. A terminal LAN port observation unit 2030 provided in the child apparatus 5*a* checks whether the terminal (7*a*1, for example) is switched on and whether a LAN port of the terminal has frame data to transfer, and informs the parent apparatus of the checking result using the control header of the uplink multi-frame.

A power supply state observation unit 2010 in the parent apparatus 1 assigns, based on the checking result, a predetermined band (uplink) to the terminals in which user frames to be transferred are stored. The power supply state observation unit 2010 further assigns a minimum fixed band (uplink) to the terminals that is switched on but has no user frame to transfer, and assigns no uplink band to the terminal that is switched off. A band change control unit 2020 controls the timing of the power supply observation unit 2010 to assign bands to each terminal at a constant cycle time.

As described above, the parent apparatus 1 can change the uplink bands assigned to terminals connected to each child apparatus, and accordingly multiplex user frames efficiently.

By the way, a multicast service is a network service in which a user frame transmitted by a terminal in a multicast group consisting of a plurality of terminals is automatically transferred to all terminals in the multicast group.

In the case of ATM-POM where the downlink frames are multiplexed by TDM (time domain multiplexing), each TDM channel is assigned to a terminal, and the child apparatus knows which TDM channel is assigned to a terminal connected to the child apparatus itself. The child apparatus transfers a multicast frame to only the terminals in the multicast group, and does not transfer the multicast frame to the terminal that is not a member of the multicast group.

In the case of the present invention in which user frames of variable length are multiplexed in the downlink multi-frame, however, terminals are not necessarily assigned to a channel. Since the child apparatus does not know which terminal is connected to the child apparatus itself, the child apparatus cannot transfer the multicast frame by identifying which terminal is a member of the multicast group.

Figure 23:
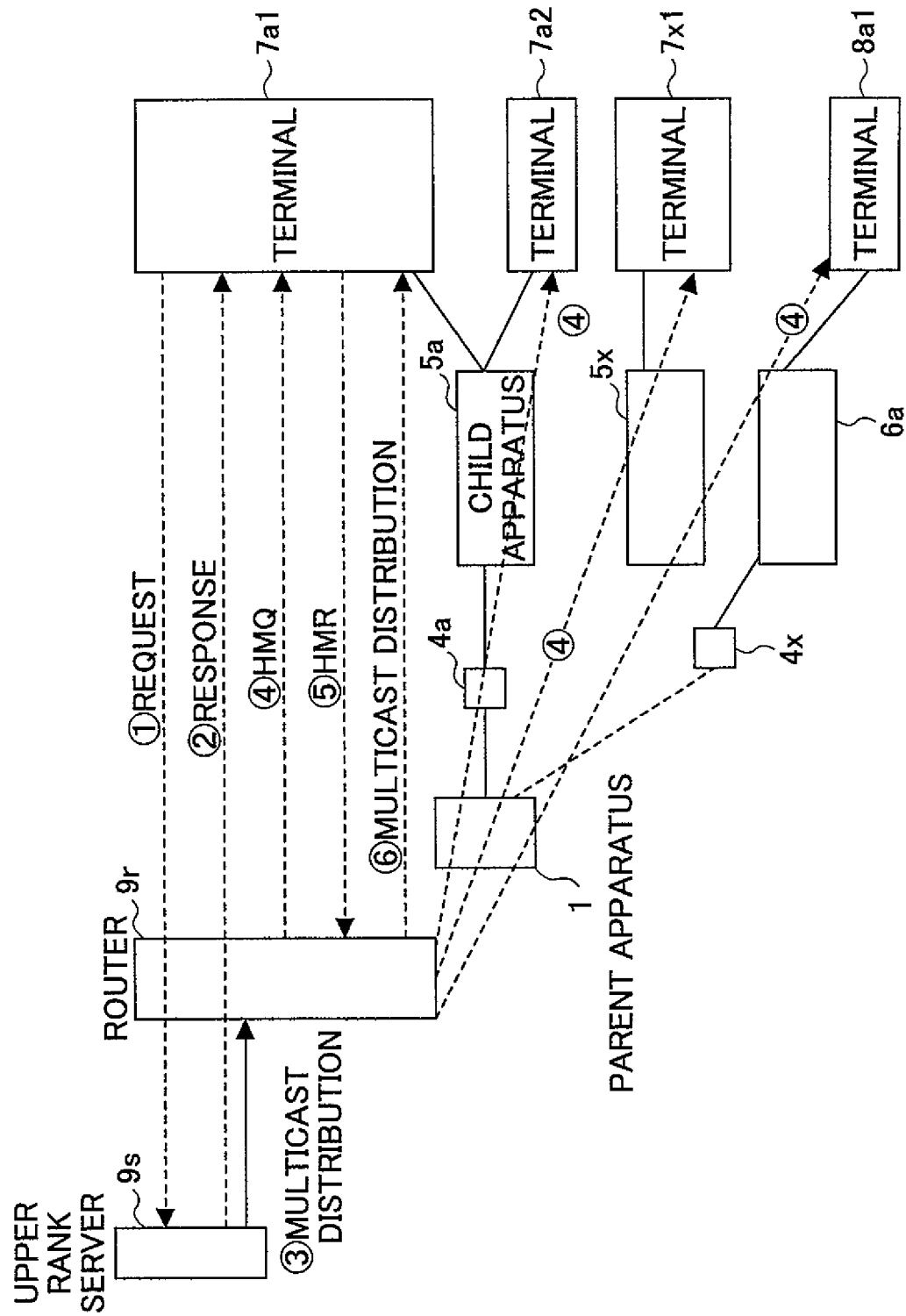
FIG. 23 is a schematic drawing showing an operation of IGMP.

The operation of the Internet group management protocol (IGMP) will be described by reference to FIG. 23. The terminal 7*a*1 that wants to join the multicast group sends a request to an upper rank server 9*s* operating as a host through a router 9*r*. The upper rank server 9*s*, in response to a receipt of the request, responds to the terminal 7*a*1 through the router 9*r*, and starts distributing the multicast frames to the router 9*r*.

In response to the receipt of the multicast frames, the router 9*r* sends a query message, a host membership query (HMQ), to all terminals under the router 9*r*. The terminal 7*a*1 that wants to join the multicast group, in response to the receipt of the query message HMQ, transfers a report message, host member report (HMR), indicating the multicast group to which the terminal 7*a*1 wants to join, to the router 9*r*. The router 9*r* learns to which multicast group the terminal 7*a*1 wants to join and starts distributing the multicast frames of the multicast group to the terminal 7*a*1.

If the terminal 7*a*1 wants to leave the multicast group, the terminal 7*a*1 sends a leave message to the router 9*r*. The router 9*r*, in response to the receipt of the leave message, transfers a query message, group specific query (GSQ), to the members of the multicast group in order to check whether any other member remains in the multicast group. If the other member (8*a*1, for example) besides the terminal 7*a*1 that has transferred the leave message exists in the multicast group, the other member 8*a*1 sends a report to the router 9*r*.

Figure 24:
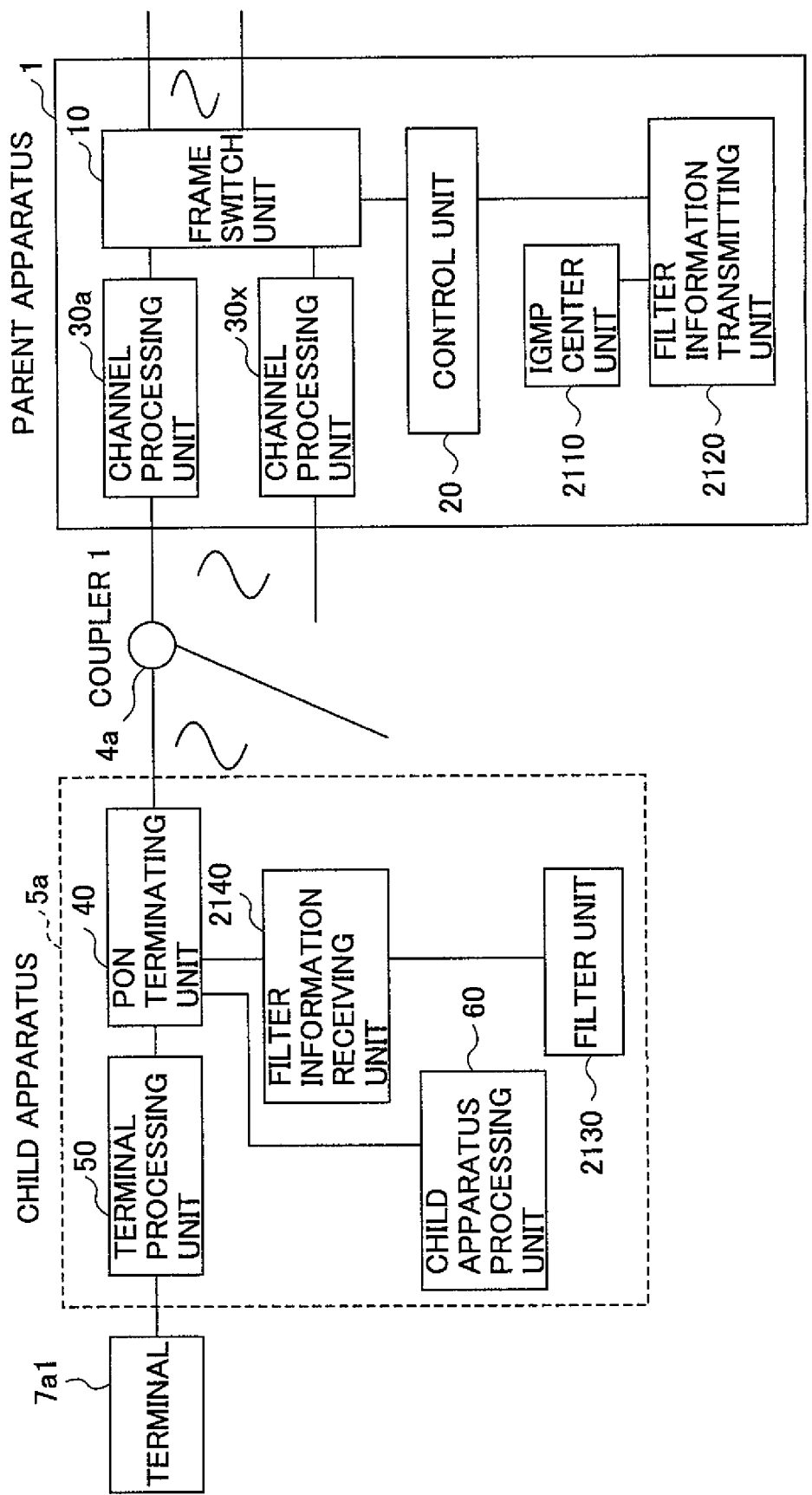
FIG. 24 is a block diagram of the first example of a parent apparatus and a child apparatus that realize multicast filtering according to the embodiment of the present invention.

FIG. 24 is a block diagram showing a parent apparatus and a child apparatus that realize multicast filtering according to an embodiment of the present invention. The components identical to those showed in FIG. 2 are referred to by the same numeral, and a description of the common components is omitted. When the terminal 7*a*1 sends a request for joining a multicast group to the upper rank server 9*s* through the child apparatus 5*a* and the parent apparatus 1, an IGMP center unit 2110 of the parent apparatus 1 (included in the transmitting frame detection circuit 350 showed in FIG. 4) identifies the sender address (the address of the terminal 7*a*1) of the user frame indicating the request and the address of the multicast group to which the terminal 7*a*1 wants to join. A filter information transmitting unit 2120 (included in the transmitting frame detection circuit 350) transfers the terminal address and the multicast group address as the predetermined information showed in FIG. 11 to the child apparatus 5*a*. A filter information receiving unit 2140 of the child apparatus 5*a* (included in the multi-frame analysis processing circuit 490) identifies the terminal address and the multicast group address by analyzing the predetermined information, and transfers both addresses to a filter unit 2130 (included in the transmitting frame processing circuit 530 showed in FIG. 8).

Accordingly, the filter unit 2130 transfers the multicast frame sent by the router to only the terminals (7*a*1, for example) of which address is registered as the multicast group address and does not transfer the multicast frame to the other terminals (multicast filtering). The PON communication system according to the embodiment does not require adding anything but the filter unit 2130 to the child apparatus to materialize the multicast filtering.

Figure 25:
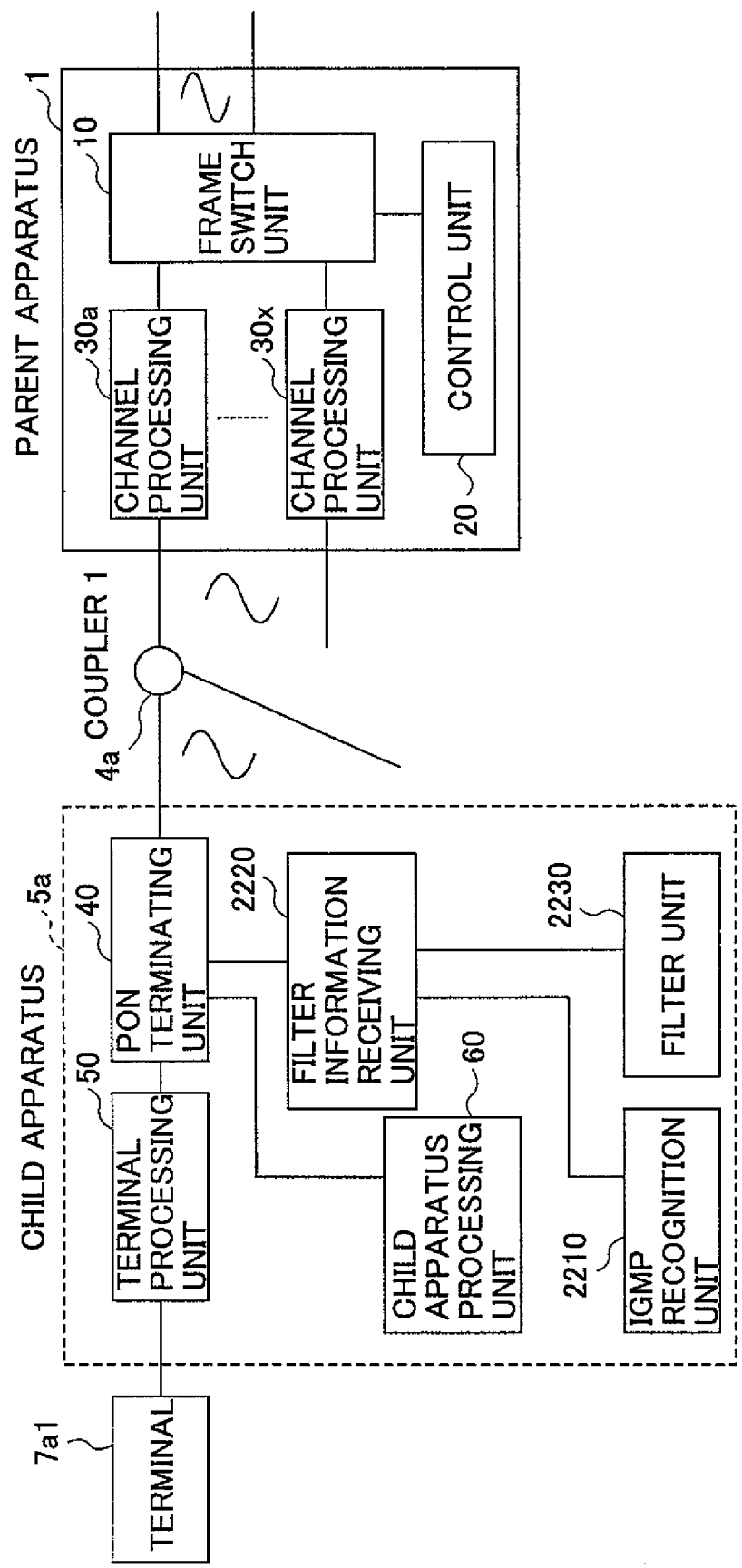
FIG. 25 is a block diagram of the second example of a parent apparatus and a child apparatus that realize multicast filtering according to the embodiment of the present invention.

FIG. 25 is a block diagram of a parent apparatus and a child apparatus that realize multicast filtering according to another embodiment of the present invention. The components identical to those showed in FIG. 2 are referred to by the same numeral and their explanation will be omitted. An IGMP recognition unit 2210 (included in the receiving frame processing circuit 540 showed in FIG. 8) of the child apparatus 5*a* identifies the sender address (the address of the terminal 7*a*1) of the user frame indicating the request to join the multicast group and the address of the multicast group, and transfers the terminal address and the multicast group address to the filter unit 2230 (included in the transmitting frame processing circuit 530).

Accordingly, the filter unit 2230 of the child apparatus 5*a* distributes the multicast frames to the terminals (7*a*1, for example) of which address is registered as an multicast group address, and does not transfer the multicast frames to the other terminals (multicast filtering). The child apparatus according to this embodiment needs to be provided with the complicated IGMP recognition unit 2210 as well as the filter unit 2230, but does not need the parent apparatus to transfer the predetermined information, which results in the more efficient use of the band between the parent apparatus and the child apparatus.

In the configurations showed in FIG. 24 and FIG. 25, if the parent apparatus 1 simply returns uplink multi-frames sent by a terminal connected to the child apparatus 5*a* to the child apparatus 5*a*, the terminal can communicate with another terminal connected to the child apparatus 5*a* and/or yet another terminal connected to a child apparatus connected to the parent apparatus 1 (local communication). It is required in this case that the downlink multi-frame has band N times greater than the band of the uplink multi-frame.

The filter units 2130 and 2230 in the transmitting frame processing circuit 530 (FIG. 8) of the terminal processing unit 50 need to check the destination address and the sender address to determine whether a frame is to be transferred, and to not transfer the frame if the sender address is the child apparatus itself or the terminals connected to the child apparatus.

Figure 26:
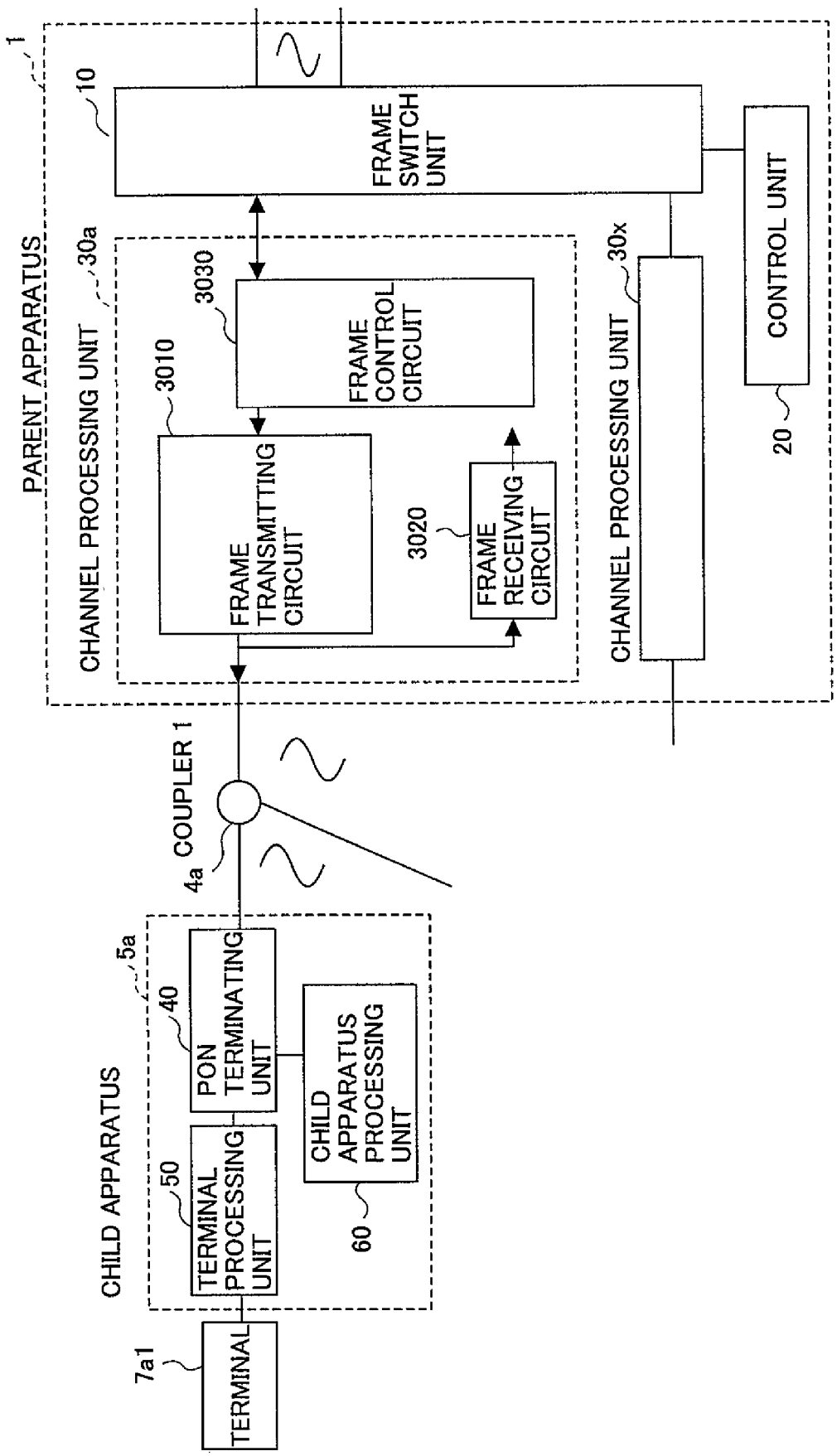
FIG. 26 is a block diagram of the first example of a parent apparatus and a child apparatus that realize local communication according to the embodiment of the present invention.
Figure 27:
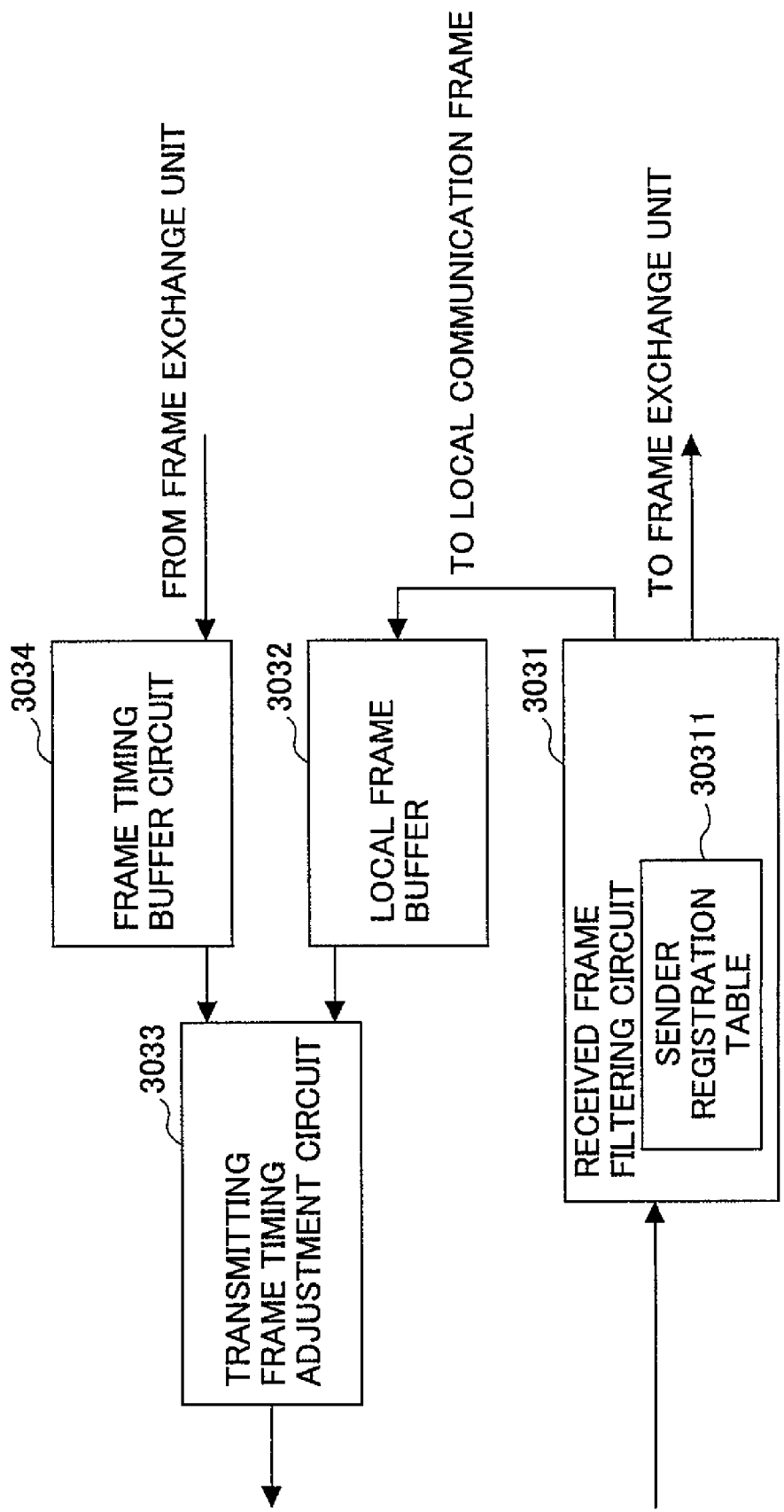
FIG. 27 is a block diagram showing a frame control circuit 3030 according to the embodiment of the present invention.

FIG. 26 is a block diagram of a parent apparatus and a child apparatus that realize local communication according to an embodiment of the present invention. The components identical to those showed in FIG. 2 are referred to by the same numerals. A description of the common components is omitted. The operation of a frame transmitting circuit 3010 and a frame receiving circuit 3020 includes all the transmitting operations and the receiving operations, respectively, described above. A frame control circuit 3030 is the circuit that realizes the local communication by returning the uplink multi-frame to each child apparatus FIG. 27 is a block diagram of the frame control circuit 3030 according to an embodiment of the present invention. A filtering circuit 3031 has a sender registration table 30311. If the destination address of a received user frame matches one of sender addresses registered in the sender registration table 30311, the received user frame is transferred to a local frame buffer 3032 as a local communication frame.

In the case, even if the sender address of the received user frame matches one of the sender addresses registered in the sender address registration table 30311, the sender address of the received user frame is identical to the child apparatus number in which the sender address registration table 30311 is provided, the received user frame is exchanged or otherwise abolished. This user frame is sent for local communication between terminals connected to the child apparatus. An unnecessary increase in traffic of a PON can be avoided by abolishing the unnecessary user frame.

Frames stored in the local frame buffer 3032 for local communication are multiplexed with the frames received from the exterior (through the frame switch unit 10) and transferred as a downlink multi-frame through a transmitting frame timing adjustment circuit 3033. A frame timing buffer 3034 is a buffer to store temporarily a frame transferred from the frame switch 10 while another frame is transferred from the local frame buffer 3032.

In the embodiments described above, the multi-frame timing detection circuit 4810 corresponds to a reference signal detecting unit; the multi-frame multiplexing circuit 440 corresponds to a multiplexing unit; the optical multiplexing circuit 410a corresponds to a transmitting unit; the multi-frame multiplexing circuit 340 corresponds to a multi-frame generating unit; the multi-frame multiplexing circuit 440 corresponds to an accumulated frame size informing unit; the statistics circuit 3910 corresponds to a frame size adjusting unit; the IGMP center unit 2110 corresponds to a multicast administrating unit; the filter unit 2130 corresponds to a filtering unit; the IGMP recognition unit 2210 corresponds to a multicast recognizing unit; the timing control unit 9203 corresponds to an interruption administrating unit; the timing control unit 9103 corresponds to a restoration controlling unit; the frame control circuit 3030 corresponds to a frame returning unit; the received frame filtering circuit 3031 corresponds to a received frame filtering unit; the terminal LAN port observation unit 2030 corresponds to a terminal observing unit; and the power supply state observation unit 2010 corresponds to a band assigning unit.

The preferred embodiments of the present invention are described above. The present invention is not limited to these embodiments, but various variations and modifications may be made without departing from the scope of the present invention.

This patent application is based on Japanese priority patent application No. 2001-353754 filed on Nov. 19, 2001, the entire contents of which are hereby incorporated by reference.

What is claimed is:

1. A method of communicating through a PON in which a plurality of child apparatuses is connected to a parent apparatus through a coupler, the method comprising:
    providing by the parent apparatus a multi-frame reference signal to the plurality of child apparatuses; and
    transmitting by each of the plurality of child apparatuses a variable-length frame to the parent apparatus at respective timing using the multi-frame reference signal provided by the parent apparatus as a reference,
    wherein the timing of the transmission of the variable-length frame by each of the plurality of child apparatuses and a corresponding variable-length of the respective variable-length frame is designated by the parent apparatus and communicated using the multi-frame reference signal and
    a frame size of a child apparatus is adjusted based on a ratio of a frame size of a variable-length frame received from the child apparatus and a frame size designated to the child apparatus.

2. The method as claimed in claim 1, wherein the multi-frame reference signal provided by the parent apparatus to the plurality of child apparatuses contains multiplexed variable-length frames and a reference signal.

3. A child apparatus for a PON in which a plurality of child apparatuses is connected to a parent apparatus through a coupler, comprising:
    a reference signal detecting unit adapted to detect a multi-frame reference signal provided by the parent apparatus;
    a multiplexing unit adapted to multiplex variable-length frames received from a plurality of terminals connected to the child apparatus;
    a transmitting unit adapted to transmit the multiplexed variable-length frames to said parent apparatus at respective timing and according to a variable-length designated by the parent apparatus using the multi-frame reference signal detected by said reference signal detecting unit; and
    a terminal monitoring unit adapted to monitor a power supply condition and the presence of frame data of the plurality of terminals connected to the child apparatus, and informs the parent apparatus of the monitored power supply condition and frame data amount.

4. The child apparatus as claimed in claim 3, further comprising an accumulated frame size informing unit adapted to periodically inform the parent apparatus of an accumulated frame size of said variable-length frames received from the plurality of terminals.

5. The child apparatus as claimed in claim 3, further comprising:
    a filtering unit adapted to distribute multicast frames to only the terminals that have joined a multicast group; and
    a multicast recognizing unit adapted to set said filtering unit to distribute the multicast frames to said terminal when said multicast recognizing unit learns that a frame sent by a terminal connected to said child apparatus is a request to join the multicast group.

6. The child apparatus as claimed in claim 3, further comprising:
    one or more buffers adapted to buffer the multiplexed variable-length frames, wherein there is a buffer for each of the multiplexed frames; and a restoration control unit adapted to control the receipt of the variable-length frames from the parent apparatus, wherein if an interruption flag is detected in a particular variable-length frame being stored in a buffer, said restoration control unit stores following variable-length frame in another buffer having higher priority than the buffer, and then stores the remainder of the particular variable-length frame in the buffer.

7. A parent apparatus for a PON in which a plurality of child apparatuses is connected to the parent apparatus through a coupler, the parent apparatus comprising:

a multi-frame generating unit adapted to generate a multi-frame reference signal by multiplexing variable-length frames to be sent to the plurality of child apparatuses and attaching a reference signal to the multiplexed variable-length frames;

a timing decision unit adapted to decide the frame size of the variable-length frame that each of the plurality of child apparatuses can transmit to the parent apparatus and the respective timing of the transmission, and to communicate the decided frame size and timing to each of the plurality of child apparatuses; and a frame size adjusting unit adjusting a frame size designated to a child apparatus based on a ratio of a frame size of a variable-length frame received from the child apparatus and a frame size previously designated to the child apparatus.

8. The parent apparatus as claimed in claim 7, wherein said frame size adjusting unit reduces the frame size to be designated to the child apparatus if the ratio is less than a predetermined minimum value.

9. The parent apparatus as claimed in claim 7, wherein said frame size adjusting unit increases the frame size to be designated to the child apparatus if the ratio is greater than a predetermined maximum value.

10. The parent apparatus as claimed in claim 7, further comprising a multicast administrating unit adapted to determine whether a frame sent by a terminal connected through a child apparatus is a request to join a multicast group, and to set a filtering unit provided in said child apparatus to distribute multicast frames to said terminal.

11. The parent apparatus as claimed in claim 10, further comprising a frame returning unit adapted to return a frame received from one of the child apparatuses to the child apparatuses.

12. The parent apparatus as claimed in claim 11, further comprising:

a sender registering table adapted to register a sender address of a terminal connected to the parent apparatus via a child apparatus and a child apparatus number corresponding to the child apparatus of a received frame; and a received frame filtering unit adapted to set said frame returning unit to return the received frame if the sender address and the child apparatus number of said received frame matches a sender address and a child apparatus number registered in said sender registering table.

13. The parent apparatus as claimed in claim 7, further comprising a plurality of output queues corresponding to the respective child apparatuses, wherein said frames to be sent to said child apparatuses are assigned to said output queues equally.

14. The parent apparatus as claimed in claim 13, wherein the frames to be sent to the child apparatuses are output from said output queues at a constant cycle time.

15. The parent apparatus as claimed in claim 7, further comprising:

one or more buffers adapted to buffer the variable-length frames to be multiplexed, wherein there is a buffer for each of the multiplexed frames; and an interruption control unit adapted to interrupt the transmission of a variable-length frame buffered in a buffer, setting an interruption flag to the transmitted variable-length frame when another variable-length frame having higher priority is buffered in another buffer, transmit the other variable-length frame having higher priority to the child apparatus, and then resume the transmission of the variable-length frame.

16. The parent apparatus as claimed in claim 7, further comprising a bandwidth assigning unit adapted to assign bandwidth to a terminal based on a power supply condition and the presence of frame data of the terminal monitored by the child apparatus.

* * * * *